US010592880B2

(12) United States Patent
Engles et al.

(10) Patent No.: US 10,592,880 B2
(45) Date of Patent: *Mar. 17, 2020

(54) PORTABLE ELECTRONIC DEVICE SALES, PROVISIONING, AND USER CARE VENDING KIOSK

(71) Applicant: ACCENTURE GLOBAL SOLUTIONS LIMITED, Dublin (IE)

(72) Inventors: Edward Engles, Washington, DC (US); Todd Egan, Morris Plains, NJ (US); Tammy Whyman, Great Falls, VA (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/167,027

(22) Filed: Oct. 22, 2018

(65) Prior Publication Data
US 2019/0057366 A1 Feb. 21, 2019

Related U.S. Application Data

(63) Continuation of application No. 15/485,022, filed on Apr. 11, 2017, now Pat. No. 10,140,601.

(51) Int. Cl.
G06Q 20/18 (2012.01)
G06Q 30/06 (2012.01)
(Continued)

(52) U.S. Cl.
CPC .............. *G06Q 20/18* (2013.01); *G06Q 30/00* (2013.01); *G06Q 30/016* (2013.01);
(Continued)

(58) Field of Classification Search
CPC ..... H04W 8/24; G06Q 20/18; G06Q 30/0631; G06Q 30/00; G06Q 30/016;
(Continued)

(56) References Cited

U.S. PATENT DOCUMENTS 8,755,783 B2 * 6/2014 Brahami ................. G07F 17/40
455/418
2002/0034940 A1 * 3/2002 Takae ...................... H04M 3/42
455/418
(Continued)

FOREIGN PATENT DOCUMENTS

JP 2001319272 11/2001
WO 2009/094643 7/2009
(Continued)

*Primary Examiner* — William Nealon
(74) *Attorney, Agent, or Firm* — Mannava & Kang, P.C.

(57) ABSTRACT

In some examples, portable electronic device sales, provisioning, and user care may include authenticating a user associated with a user portable electronic device. A user portable electronic device connector may be used to communicatively connect to a portable electronic device receptacle of the user portable electronic device, and transfer data and/or configurations associated with the user portable electronic device to a data storage. Options to purchase a new portable electronic device may be displayed. Selection of a new portable electronic device may be received from a display of at least one new portable electronic device, and the selected new portable electronic device may be configured by transferring, from the data storage, the data and/or the configurations associated with the user portable electronic device to the selected new portable electronic device.

17 Claims, 22 Drawing Sheets

(51) Int. Cl.
*H04W 8/24* (2009.01)
*G06F 3/0482* (2013.01)
*G06K 9/00* (2006.01)
*G06Q 30/00* (2012.01)
*G06Q 30/08* (2012.01)
*G06Q 50/30* (2012.01)
*G06Q 30/02* (2012.01)
*G06F 11/14* (2006.01)

(52) U.S. Cl.
CPC ..... *G06Q 30/0237* (2013.01); *G06Q 30/0631* (2013.01); *G06Q 30/08* (2013.01); *G06Q 50/30* (2013.01); *H04W 8/24* (2013.01); *G06F 3/0482* (2013.01); *G06F 11/1402* (2013.01); *G06K 9/00288* (2013.01)

(58) Field of Classification Search
CPC .... G06Q 30/0237; G06Q 30/08; G06Q 50/30; G06F 3/0482; G06F 11/1402; G06K 9/00288

USPC ....................................................... 455/418
See application file for complete search history.

(56) References Cited

U.S. PATENT DOCUMENTS

| 2010/0188222 | A1 | 7/2010 | Irmscher et al. | |
|---|---|---|---|---|
| 2010/0228676 | A1 | 9/2010 | Librizzi et al. | |
| 2013/0198144 | A1 | 8/2013 | Bowles | |
| 2013/0268408 | A1* | 10/2013 | Mebed | G06Q 30/0627 705/26.62 |
| 2015/0350888 | A1* | 12/2015 | Miranda | H04M 15/715 705/16 |
| 2017/0256119 | A1* | 9/2017 | Abdelmalak | G06Q 20/322 |

FOREIGN PATENT DOCUMENTS

| WO | WO 2009/094643 A1 * | 7/2009 |
|---|---|---|
| WO | 2016/195648 | 12/2016 |

* cited by examiner

PORTABLE ELECTRONIC DEVICE SALES, PROVISIONING, AND USER CARE VENDING KIOSK

PRIORITY

This application is a Continuation of commonly assigned and co-pending U.S. patent application Ser. No. 15/485,022, filed Apr. 11, 2017, the disclosure of which is hereby incorporated by reference in its entirety.

BACKGROUND

Merchandise may be sold at a variety of outlets, such as retail outlets, online, etc. For example, in retail outlets, merchandise may be displayed and sold to customers. A retail outlet may provide a potential customer with the ability to inspect the merchandise before purchase. With respect to an online environment, merchandise may be purchased by a customer by analyzing information about the merchandise, analyzing customer reviews associated with the merchandise, and other such attributes associated with the merchandise.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
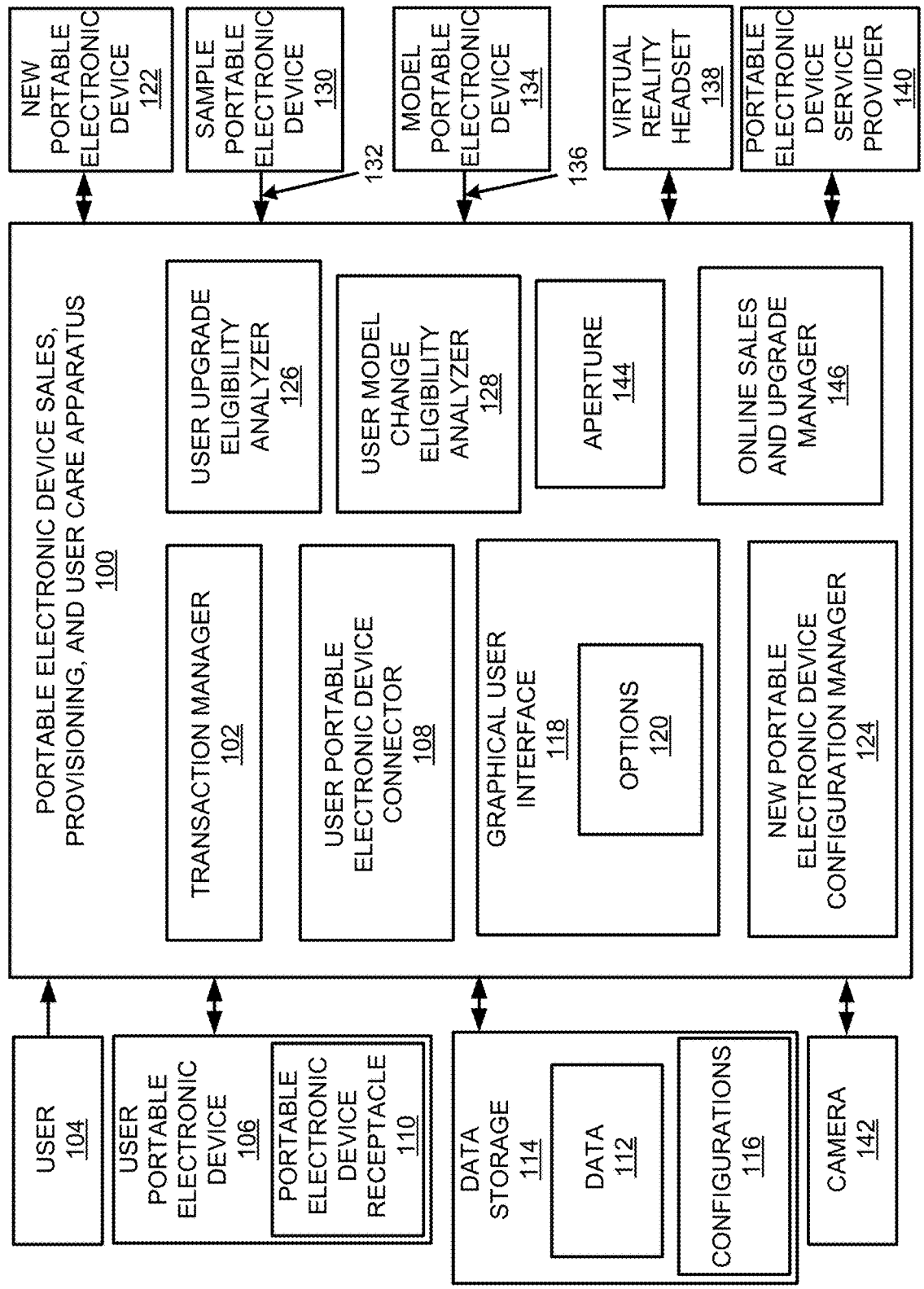
FIG. 1 illustrates a layout of a portable electronic device sales, provisioning, and user care apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Portable electronic device sales, provisioning, and user care apparatuses, methods for portable electronic device sales, provisioning, and user care, and non-transitory computer readable media having stored thereon machine readable instructions to provide portable electronic device sales, provisioning, and user care are disclosed herein. The apparatuses, methods, and non-transitory computer readable media disclosed herein provide a one-stop destination for portable electronic device purchase and/or upgrade that may include, for example, portable electronic device shopping, trade-in, back-up, activation, payment, plan changes, etc. A portable electronic device, as described herein, may include any type of device, such as a telephone, a laptop computer, an internet-connected watch, a tablet computer, etc. According to an example, an apparatus of the portable electronic device sales, provisioning, and user care apparatuses may be in the form of a vending kiosk.

With respect to aspects such as sales, provisioning, and user care associated with telephones and other such portable electronic devices, a user may need to visit a retail outlet to analyze different types of portable electronic devices. For the example of a telephone, the user may purchase a telephone at such a retail outlet, and then contact a service carrier to activate the telephone. Alternatively, if a user owns a telephone that is to be upgraded, a user may similarly need to visit a retail outlet to analyze different types of telephones. In this regard, the user may seek the assistance of a customer service representative at the retail outlet to complete the purchase of a new telephone. Alternatively, a user may purchase a telephone online, and activate the telephone after receiving the telephone after a predetermined time period based on shipping of the telephone to the user.

Each of the aforementioned aspects with respect to a user's need to visit a retail outlet and/or purchase a portable electronic device online may likely deter a user from purchasing a portable electronic device, such as a telephone. For example, the user may not have the time to visit a retail outlet to purchase a new portable electronic device. Alternatively or additionally, the user may be deterred from purchasing a new portable electronic device online based, for example, on the images of the portable electronic device that limit the user's ability to physically analyze the portable electronic device.

In order to address at least these technical challenges with respect to the purchase and/or upgrade of portable electronic devices, such as telephones, the apparatuses, methods, and non-transitory computer readable media disclosed herein provide a one-stop destination for portable electronic device purchase and/or upgrade that may include, for example, portable electronic device shopping, trade-in, back-up, activation, payment, plan changes, etc. For the apparatuses, methods, and non-transitory computer readable media disclosed herein, a user may access a user account, and plug the user's current portable electronic device into a port, such as a media port. Once connected, processes such as portable electronic device back-up, data transfer, configuration transfer, etc., may be commenced. The user may engage with a graphical user interface (GUI) display, which may include a liquid crystal display (LCD) screen to determine what account action the user would like to take. For example, the user may be provided with an opportunity to interact with potential new portable electronic devices. For a user that is to upgrade the user portable electronic device to a new portable electronic device, data including media and contacts, and/or configurations of the user portable electronic device may be transferred to a displayed portable electronic device that is selected by the user, and the activation of the selected portable electronic device may be initiated. Once the selected portable electronic device is activated, the user may complete the purchase of the selected portable electronic device by selecting appropriate payment options.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example of a portable electronic device sales, provisioning, and user care apparatus (hereinafter also referred to as "apparatus 100").

Referring to FIG. 1, the apparatus 100 may include a transaction manager 102, executed by at least one hardware processor (e.g., the hardware processor 2002 of FIG. 20 and/or the hardware processor 2204 of FIG. 22), to authenticate a user 104 associated with a user portable electronic device 106, such as a user telephone. The example of the apparatus 100, as described with reference to FIGS. 1-22, is disclosed herein with respect to the portable electronic device including a telephone. However, a portable electronic device, as described herein, may include any type of device, such as a telephone, a laptop computer, an internet-connected watch, a tablet computer, etc.

A user portable electronic device connector 108 that is executed by the at least one hardware processor (e.g., the hardware processor 2002 of FIG. 20 and/or the hardware processor 2204 of FIG. 22) is to communicatively connect to a portable electronic device receptacle 110 of the user portable electronic device 106. For example, for a user portable electronic device 106 that includes an iOS™ based portable electronic device, the portable electronic device receptacle 110 may include a LIGHTNING™ charging port. In this regard, the user portable electronic device connector 108 may include a plurality of connectors for different types of portable electronic devices to communicatively connect to the portable electronic device receptacle 110 of the user portable electronic device 106. The user portable electronic device connector 108 is to transfer, based on the connection and the authentication of the user 104 associated with the user portable electronic device 106, data 112 from the user portable electronic device 106 to a data storage 114. The data 112 may include, for example, media, contacts, etc., stored on the user portable electronic device 106. The user portable electronic device connector 108 is to further transfer, based on the connection and the authentication of the user 104 associated with the user portable electronic device 106, configurations 116 associated with the user portable electronic device 106 to the data storage 114. The configurations 116 may include, for example, settings, screen displays, etc., associated with the user portable electronic device 106.

The transfer (and/or back-up) of the data 112 and/or the configurations 116 may be platform agnostic with respect to the user portable electronic device 106. For example, the transfer (and/or back-up) of the data 112 and/or the configurations 116 may be performed regardless of whether the user portable electronic device 106 is an iOS™ portable electronic device, an ANDROID™ portable electronic device, a MICROSOFT™ portable electronic device, etc.

The user portable electronic device connector 108 may implement transfer (and/or back-up) technology to perform the transfer (and/or back-up) operations on an expedited basis. For example, the transfer (and/or back-up) operations may be performed within a specified duration of 1.5 minutes.

A GUI 118 that is executed by the at least one hardware processor (e.g., the hardware processor 2002 of FIG. 20 and/or the hardware processor 2204 of FIG. 22) is to display options 120 to purchase or upgrade to a new portable electronic device. For example, the GUI 118 may include an LCD or another type of screen to display the options 120 to purchase a new portable electronic device. According to an example, the options 120 may include, for example, a display of at least one new portable electronic device 122, and/or an option to view a virtual reality display of the at least one new portable electronic device 122. The at least one new portable electronic device 122 may include, for example, a plurality of portable electronic devices that are of a similar model type as the user portable electronic device 106, and/or a plurality of portable electronic devices that are of a different model type compared to the user portable electronic device 106. The at least one new portable electronic device 122 may be displayed and/or identified for the user 104 based on aspects such as surveys of user preferences, personalized portable electronic device suggestions for the particular user 104 based on aspects such as the user's gender, age, location, etc.

A new portable electronic device configuration manager 124 that is executed by the at least one hardware processor (e.g., the hardware processor 2002 of FIG. 20 and/or the hardware processor 2204 of FIG. 22) is to receive selection of a new portable electronic device (e.g., also designated a selected new portable electronic device) from the display of the at least one new portable electronic device 122. Further, the new portable electronic device configuration manager 124 is to configure the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device. The new portable electronic device configuration manager 124 may implement transfer technology to perform the transfer operations on an expedited basis. For example, the transfer operations may be performed within a specified duration of 1.5 minutes.

According to an example, the at least one new portable electronic device 122 displayed for the options 120 to purchase the new portable electronic device may be of a similar model type as the user portable electronic device 106 and may represent an upgrade of the user portable electronic device 106. In this regard, a user upgrade eligibility analyzer 126 that is executed by the at least one hardware processor (e.g., the hardware processor 2002 of FIG. 20 and/or the hardware processor 2204 of FIG. 22) is to determine an eligibility of the user to upgrade to the at least one new portable electronic device 122 displayed for the options 120 to purchase the new portable electronic device. In response to a determination that the user is eligible to upgrade to the at least one new portable electronic device 122 displayed for the options 120 to purchase the new portable electronic device, the user upgrade eligibility analyzer 126 may identify the at least one new portable electronic device 122 displayed for the options 120 to purchase the new portable electronic device as being eligible for the upgrade. Alternatively, in response to a determination that the user is not eligible to upgrade to the at least one new portable electronic device 122 displayed for the options 120 to purchase the new portable electronic device, the user upgrade eligibility analyzer 126 may identify the at least one new portable electronic device 122 displayed for the options 120 to purchase the new portable electronic device as being ineligible for the upgrade.

According to an example, the at least one new portable electronic device 122 displayed for the options 120 to purchase the new portable electronic device may be of a different model type compared the user portable electronic device 106 and may represent a model change of the user portable electronic device 106. In this regard, a user model change eligibility analyzer 128 that is executed by the at least one hardware processor (e.g., the hardware processor 2002 of FIG. 20 and/or the hardware processor 2204 of FIG. 22) is to determine an eligibility of the user to change a model to the at least one new portable electronic device 122 displayed for the options 120 to purchase the new portable electronic device. In response to a determination that the user is eligible to change the model to the at least one new portable electronic device 122 displayed for the options 120 to purchase the new portable electronic device, the user model change eligibility analyzer 128 may identify the at least one new portable electronic device 122 displayed for the options 120 to purchase the new portable electronic device as being eligible for the model change. Alternatively, in response to a determination that the user is not eligible to change the model to the at least one new portable electronic device 122 displayed for the options 120 to purchase the new portable electronic device, the user model change eligibility analyzer 128 may identify the at least one new portable electronic device 122 displayed for the options 120 to purchase the new portable electronic device as being ineligible for the model change.

According to an example, the apparatus 100 may include (or be connected to) at least one sample portable electronic device 130 associated with a corresponding one of the at least one new portable electronic device 122 displayed for the options 120 to purchase the new portable electronic device. The sample portable electronic device 130 may include an operational portable electronic device corresponding to the at least one new portable electronic device 122. Further, a connector 132 may be used to securely retain the at least one sample portable electronic device 130. For example, detachment of the connector 132 from the apparatus 100 may result in the generation of an alarm.

According to an example, the apparatus 100 may include at least one inoperable model portable electronic device 134 associated with a corresponding one of the at least one new portable electronic device 122 displayed for the options 120 to purchase the new portable electronic device. The inoperable model portable electronic device 134 may include a non-functional version of a portable electronic device corresponding to the at least one new portable electronic device 122. Further, a connector 136 may be used to securely retain the at least one inoperable model portable electronic device 134. For example, detachment of the connector 136 from the apparatus 100 may result in the generation of an alarm.

According to an example, the apparatus 100 may include a virtual reality headset 138 to generate the virtual reality display of the at least one new portable electronic device 122. For example, the user 104 may be prompted (e.g., via the GUI 118) to place the virtual reality headset 138 on the user's head to view the virtual reality display of the at least one new portable electronic device 122. The virtual reality headset 138 may also provide an augmented reality view of the at least one new portable electronic device 122. In this regard, the augmented reality view may differ from the virtual reality view based on the inclusion of real objects and/or environmental features in the display presented to the user 104.

According to an example, the new portable electronic device configuration manager 124 is executed by the at least one hardware processor (e.g., the hardware processor 2002 of FIG. 20 and/or the hardware processor 2204 of FIG. 22) to receive authorization from a portable electronic device service provider 140 to activate the selected new portable electronic device. Further, the new portable electronic device configuration manager 124 may activate, based on the received authorization, the selected new portable electronic device.

According to an example, the GUI 118 is executed by the at least one hardware processor (e.g., the hardware processor 2002 of FIG. 20 and/or the hardware processor 2204 of FIG. 22) to display plan change options for the selected new portable electronic device, and receive selection of a plan change from the displayed plan change options. In this regard, the new portable electronic device configuration manager 124 is executed by the at least one hardware processor (e.g., the hardware processor 2002 of FIG. 20 and/or the hardware processor 2204 of FIG. 22) to receive authorization from the portable electronic device service provider 140 to activate the selected new portable electronic device, and activate, based on the received authorization and the received selection of the plan change, the selected new portable electronic device.

According to an example, the GUI 118 is executed by the at least one hardware processor (e.g., the hardware processor 2002 of FIG. 20 and/or the hardware processor 2204 of FIG. 22) to display payment options for the selected new portable electronic device, and receive selection of a payment from the displayed payment options. In this regard, the new portable electronic device configuration manager 124 is executed by the at least one hardware processor (e.g., the hardware processor 2002 of FIG. 20 and/or the hardware processor 2204 of FIG. 22) to activate, based on completion of the received selection of the payment, the selected new portable electronic device. The payment options may also pertain to aspects such as user account verification, payment for existing charges, etc.

According to an example, the transaction manager 102 is executed by at least one hardware processor (e.g., the hardware processor 2002 of FIG. 20 and/or the hardware processor 2204 of FIG. 22) to capture, by a camera 142, a user image of the user 104. The transaction manager 102 may compare the captured user image to a base user image. In response to a determination that the captured user image matches the base user image, the transaction manager 102 may authenticate the user 104 associated with the user portable electronic device 106. In this regard, other biometric authentication techniques such as techniques based on fingerprint analysis, voice analysis, retina analysis, etc., may be utilized. The camera 142 may also provide for video-based communication of the user 104 with a representative of the portable electronic device service provider 140.

According to an example, the apparatus 100 may include at least one aperture 144 to permit the user to physically touch the at least one new portable electronic device 122. For example, for the apparatus 100 that is in the form of a vending kiosk, the vending kiosk may include the aperture 144 where the user 104 may insert the user's hands into a set of gloves connected to the aperture 144 to physically analyze the at least one new portable electronic device 122.

With respect to FIGS. 1, and 4-11 that are described in further detail below, the apparatus 100 may be in the form of a vending kiosk as illustrated in FIGS. 1, and 4-11. With respect to FIGS. 12-19 that are described in further detail below, the apparatus 100 may include the functionality to coordinate the pickup of a selected new portable electronic device at a vending kiosk, where the vending kiosk may include some or all of the functionalities of the apparatus 100 illustrated in FIGS. 1, and 4-11.

With respect to the apparatus 100 that may include the functionality to coordinate the pickup of a selected new portable electronic device at a vending kiosk, according to an example, the apparatus 100 may include an online sales and upgrade manager 146 that is executed by at least one hardware processor (e.g., the hardware processor 2002 of FIG. 20 and/or the hardware processor 2204 of FIG. 22) to manage online sales and upgrade of the user portable electronic device 106 by communicatively coordinating with other components of the apparatus 100 to authenticate the user 104 associated with the user portable electronic device 106, and communicatively connecting to the portable electronic device receptacle 110 of the user portable electronic device 106. The online sales and upgrade manager 146 may communicatively coordinate with other components of the apparatus 100 to transfer, based on the connection and the authentication of the user 104 associated with the user portable electronic device 106, data 112 from the user portable electronic device 106 to the data storage 114, and transfer, based on the connection and the authentication of the user 104 associated with the user portable electronic device 106, configurations 116 associated with the user portable electronic device 106 to the data storage 114. The online sales and upgrade manager 146 may communicatively coordinate with other components of the apparatus 100 to display options 120 to purchase or upgrade to a new portable electronic device, where the options 120 may include a display of the at least one new portable electronic device 122. The online sales and upgrade manager 146 may communicatively coordinate with other components of the apparatus 100 to receive selection of a new portable electronic device from the display of the at least one new portable electronic device 122, and configure the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device. Further, the online sales and upgrade manager 146 may communicatively coordinate with other components of the apparatus 100 to generate instructions to pick up the selected new portable electronic device at a vending kiosk as described in further detail with respect to FIGS. 12-19.

According to an example, the online sales and upgrade manager 146 may communicatively coordinate with other components of the apparatus 100 to implement a communication session of the user 104 with a representative (e.g., a representative of the portable electronic device service provider 140). Further, the online sales and upgrade manager 146 may communicatively coordinate with other components of the apparatus 100 to receive, based on the communication session of the user with the representative, selection of the new portable electronic device from the display of the at least one new portable electronic device 122.

According to an example, the online sales and upgrade manager 146 may communicatively coordinate with other components of the apparatus 100 to display (e.g., via the GUI 118) a map including a location of a vending kiosk to pick up the selected new portable electronic device. Further, the online sales and upgrade manager 146 may communicatively coordinate with other components of the apparatus 100 to display (e.g., via the GUI 118) a distance to the vending kiosk, and/or a time of travel to the vending kiosk.

Figure 2:
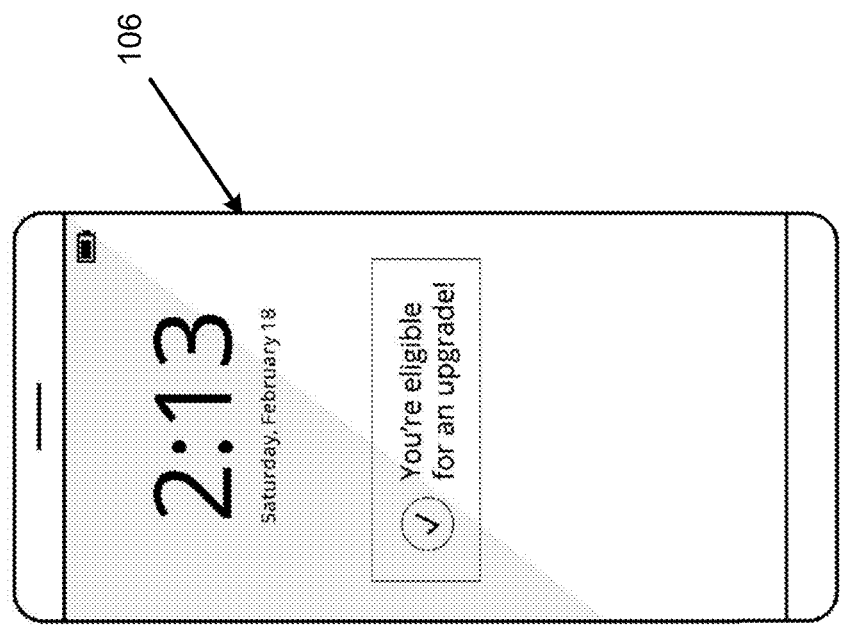
FIG. 2 illustrates an example of a user portable electronic device including a display of upgrade eligibility, in accordance with an example of the present disclosure.

FIG. 2 illustrates an example of a user portable electronic device (e.g., a telephone) including a display of upgrade eligibility, in accordance with an example of the present disclosure.

Referring to FIG. 2, for the example of the user portable electronic device 106, the user 104 may contact the portable electronic device service provider 140 to determine whether the user 104 is eligible for an upgrade. In this regard, an upgrade may be described as a change of the user portable electronic device 106 to a similar model portable electronic device as the user portable electronic device 106. For example, for an iOS™ based portable electronic device, an upgrade may be described as a change of the user portable electronic device 106 to a similar iOS™ based portable electronic device. The upgrade eligibility display of FIG. 2 may be used to notify the user 104 that they are eligible for a portable electronic device upgrade so that the user may utilize the services of the vending kiosk when they are in the vicinity of the vending kiosk. According to another example, when the user 104 is in the vicinity of a vending kiosk, the upgrade eligibility display of FIG. 2 may be displayed. In this regard, the user 104 may view the upgrade eligibility display, view the vending kiosk, and thus utilize the services of the vending kiosk to upgrade their portable electronic device.

Figure 3:
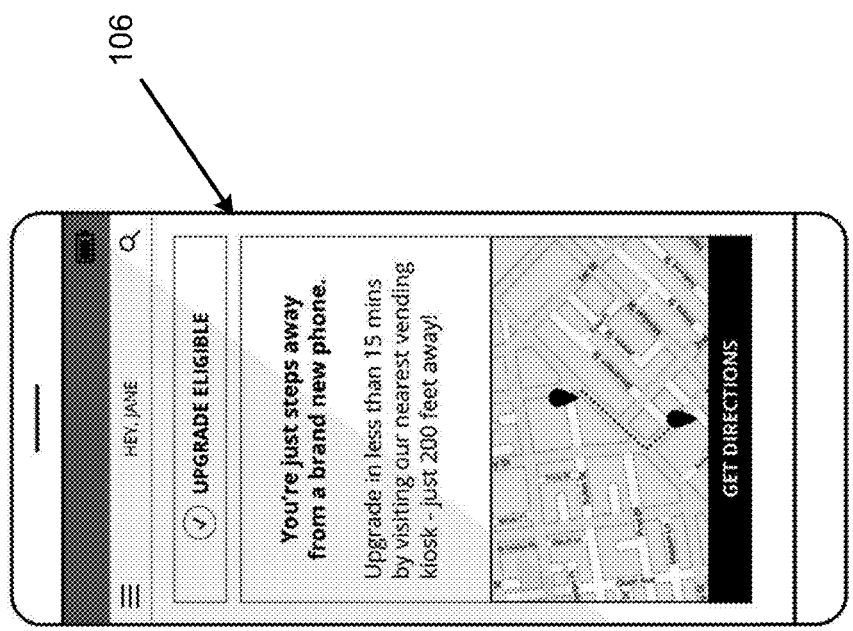
FIG. 3 illustrates an example of a user portable electronic device including a display of a nearest vending kiosk for upgrading the user portable electronic device, in accordance with an example of the present disclosure.

FIG. 3 illustrates an example of a user portable electronic device (e.g., a telephone) including a display of a nearest vending kiosk for upgrading the user portable electronic device, in accordance with an example of the present disclosure.

Referring to FIG. 3, the upgrade eligibility display of FIG. 2 may be followed by a map display of a nearest vending kiosk for upgrading the user portable electronic device 106. In this regard, the map display may include options to get directions to a nearest vending kiosk, a walking time to the nearest vending kiosk (e.g., 15 minutes), a distance to the nearest vending kiosk (e.g., 200 feet), and other such options to guide the user 104 to the nearest vending kiosk.

Figure 4:
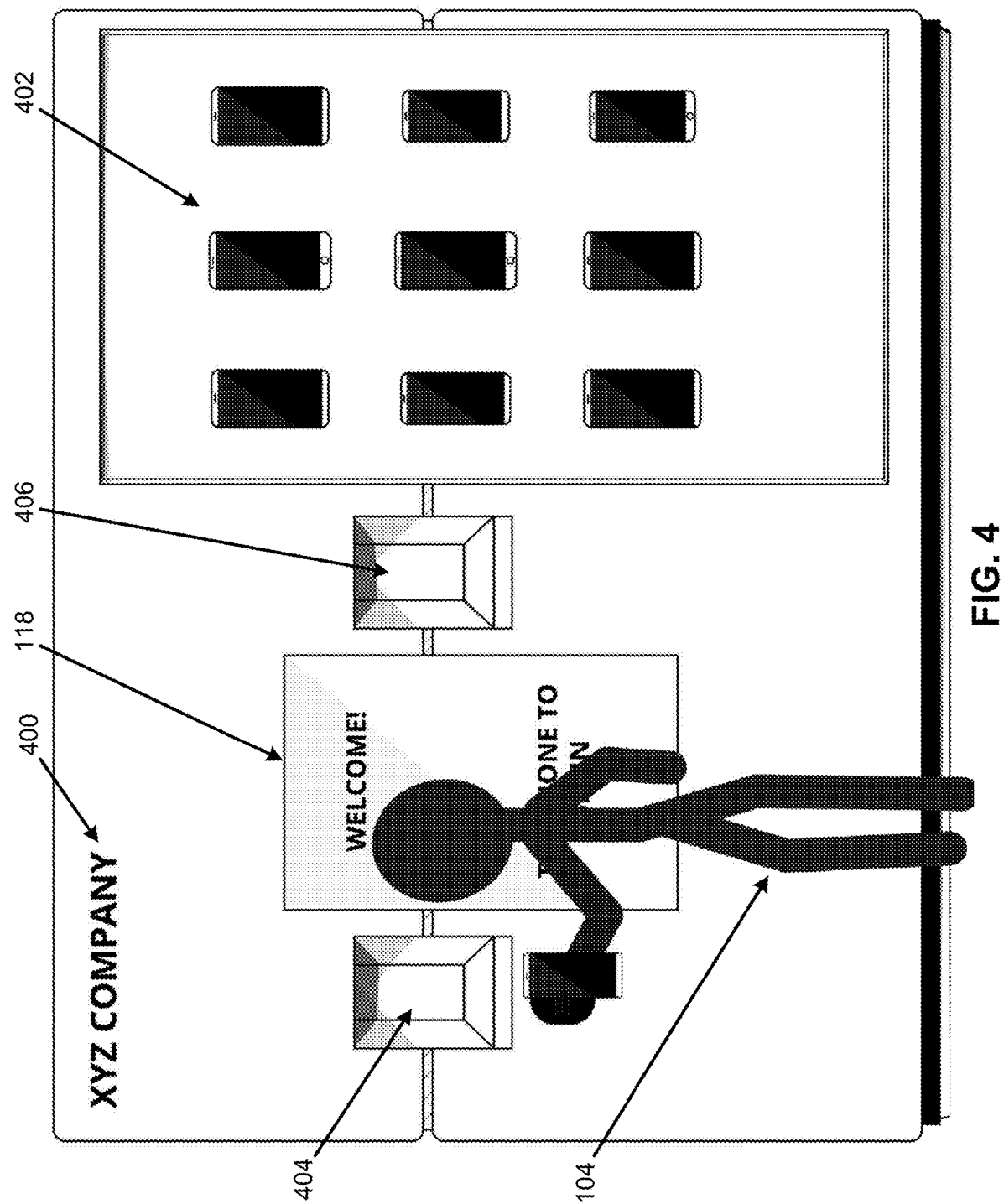
FIG. 4 illustrates an example of the portable electronic device sales, provisioning, and user care apparatus of FIG. 1, which may be in the form of a vending kiosk for upgrading the user portable electronic device, in accordance with an example of the present disclosure.

FIG. 4 illustrates an example of the apparatus 100, which may be in the form of a vending kiosk for upgrading the user portable electronic device (e.g., a telephone), in accordance with an example of the present disclosure.

Referring to FIG. 4, as disclosed herein, the apparatus 100 may be in the form of a vending kiosk as illustrated in FIGS. 1, and 4-11. In this regard, the apparatus 100 may include a logo 400 of a company associated with the portable electronic devices (e.g., XYZ Company). The apparatus 100 may include may include the GUI 118 to communicate with the user 104 as disclosed herein, a plurality of new portable electronic devices at 402, a slot 404 to receive the user portable electronic device 106, and a slot 406 to dispense the selected portable electronic device.

Figure 5:
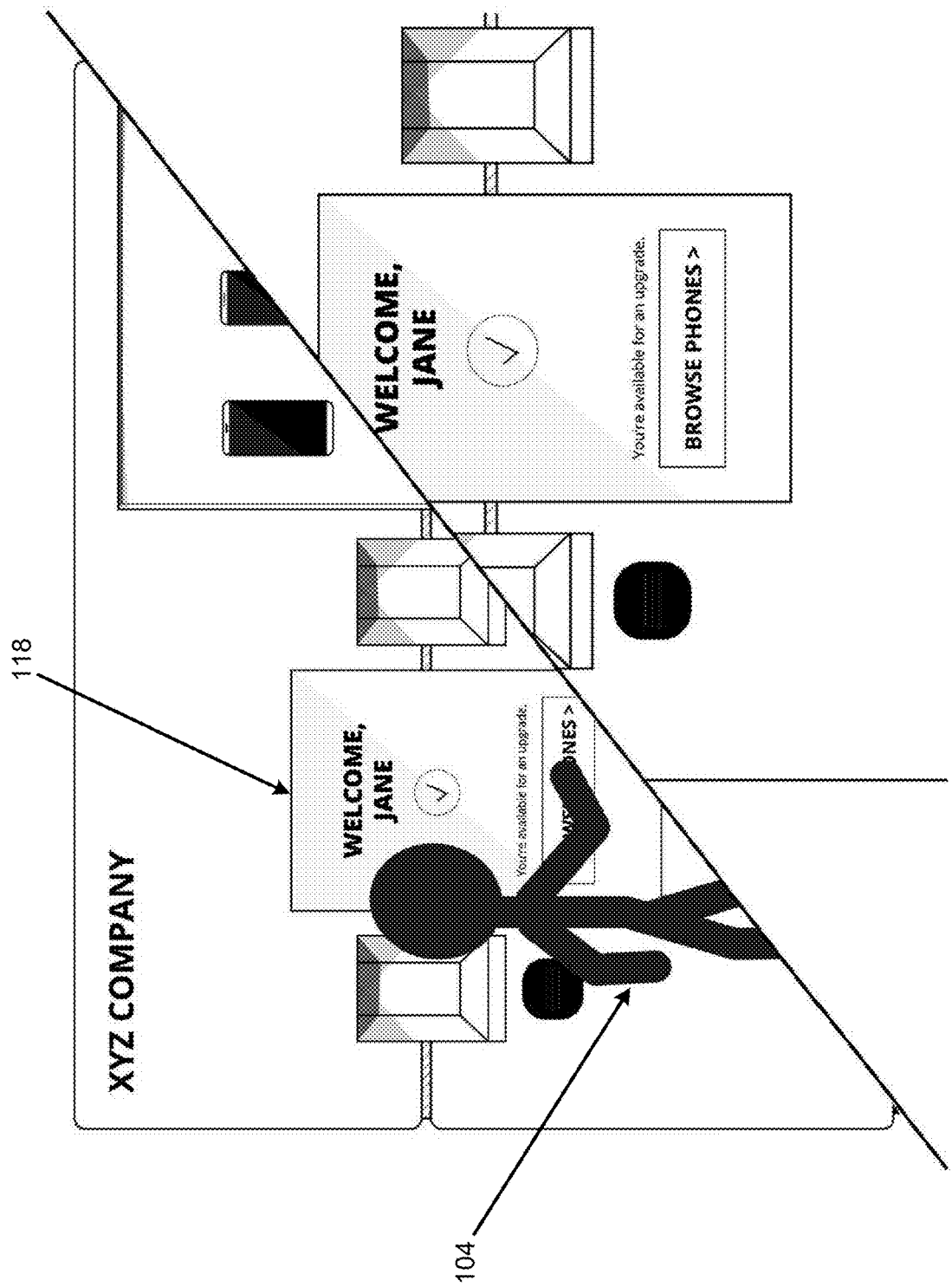
FIG. 5 illustrates a graphical user interface (GUI) display for authenticating a user for the example of the portable electronic device sales, provisioning, and user care apparatus of FIG. 1, which may be in the form of a vending kiosk as shown in FIG. 4, in accordance with an example of the present disclosure.

FIG. 5 illustrates a GUI display for authenticating a user for the example of the apparatus 100, which may be in the form of a vending kiosk as shown in FIG. 4, in accordance with an example of the present disclosure.

Referring to FIG. 5, as disclosed herein, the transaction manager 102 that is executed by at least one hardware processor (e.g., the hardware processor 2002 of FIG. 20 and/or the hardware processor 2204 of FIG. 22) is to authenticate the user 104 associated with the user portable electronic device 106, such as a user telephone. In this regard, the user 104 may be authenticated by the transaction manager 102, for example, which captures, by the camera 142, a user image of the user 104. The transaction manager 102 may compare the captured user image to a base user image. In this regard, the base user image may represent an image of the user 104 from a plurality of images of users. In response to a determination that the captured user image matches the base user image, the transaction manager 102 may authenticate the user 104 associated with the user portable electronic device 106. In this regard, other biometric authentication techniques such as techniques based on fingerprint analysis, voice analysis, retina analysis, etc., may be utilized. Once the user 104 is authenticated, the user 104 may be provided with an option to browse different phones for upgrading and/or purchasing without an upgrade.

Figure 6:
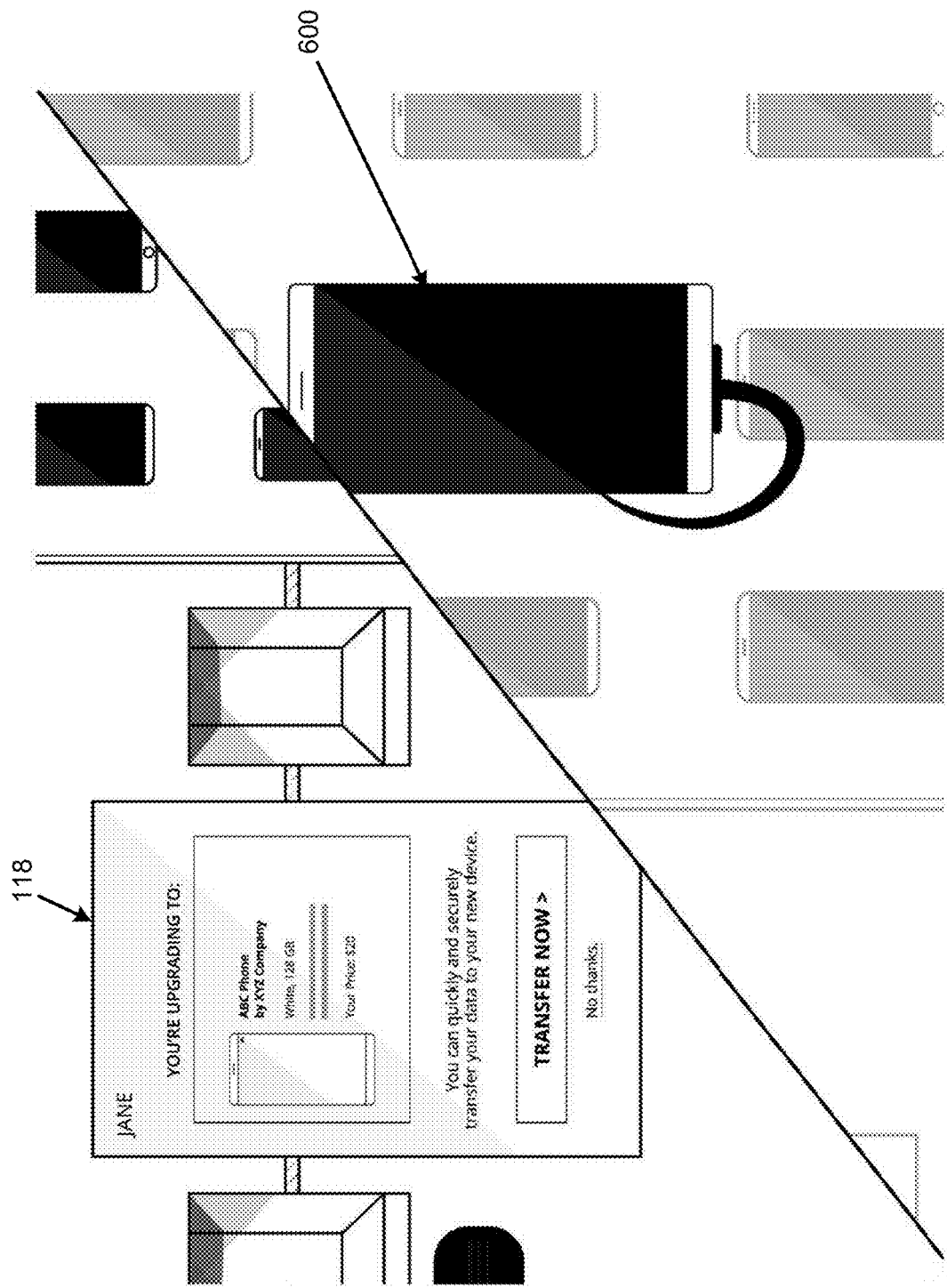
FIG. 6 illustrates a GUI display for upgrading the user portable electronic device for the example of the portable electronic device sales, provisioning, and user care apparatus of FIG. 1, which may be in the form of a vending kiosk as shown in FIG. 4, in accordance with an example of the present disclosure.

FIG. 6 illustrates a GUI display for upgrading the user portable electronic device (e.g., a telephone) for the example of the apparatus 100, which may be in the form of a vending kiosk as shown in FIG. 4, in accordance with an example of the present disclosure.

Referring to FIG. 6, as disclosed herein, the GUI display may include options for the user 104 to upgrade to a selected new portable electronic device at a specified price, initiate transfer of the data 112 and/or the configurations 116, etc. In this regard, the selected new portable electronic device may be displayed at the GUI 118 and/or highlighted (e.g., by lighting, or otherwise), at 600.

Figure 7:
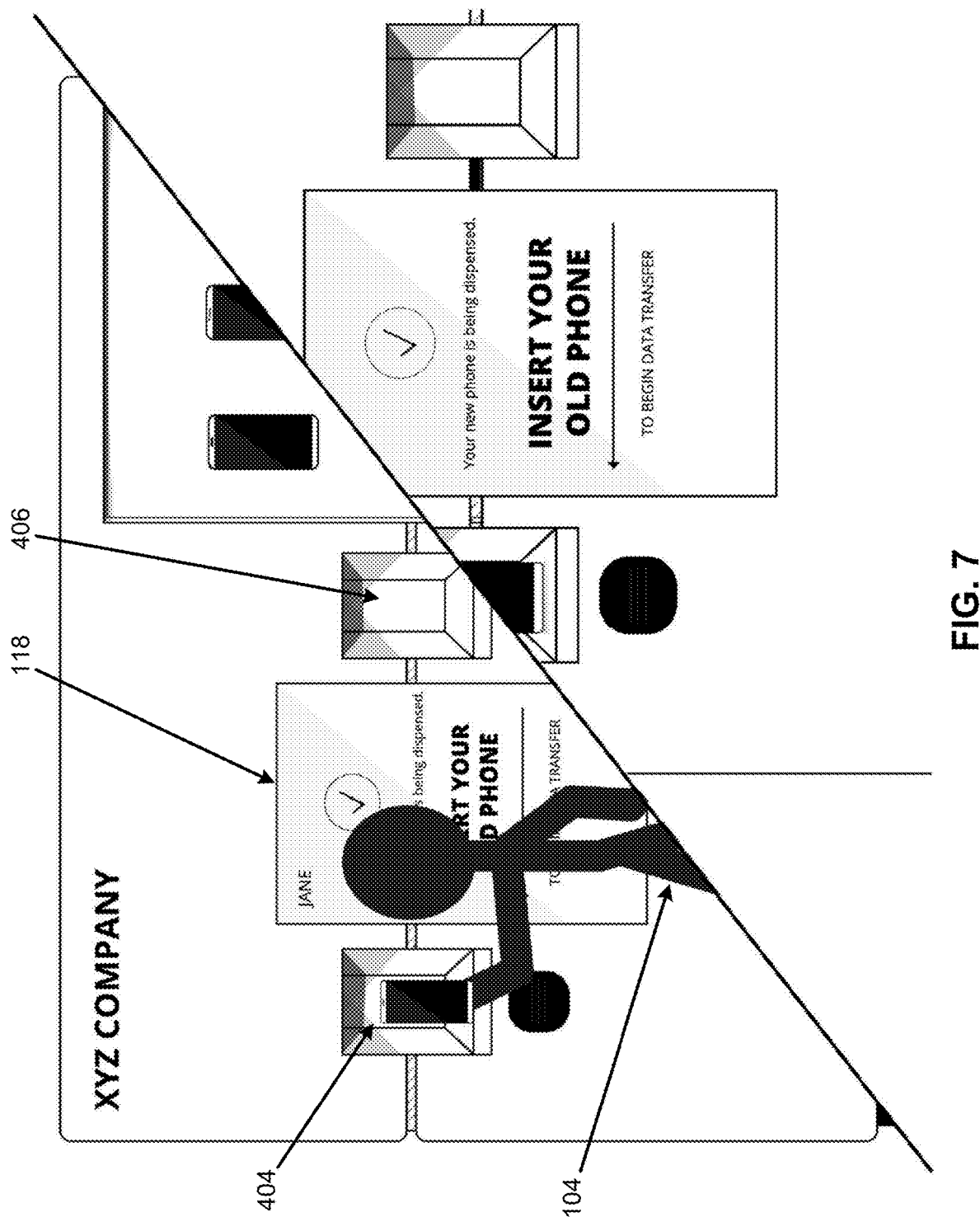
FIG. 7 illustrates a GUI display for inserting the user portable electronic device for the example of the portable electronic device sales, provisioning, and user care apparatus of FIG. 1, which may be in the form of a vending kiosk as shown in FIG. 4, in accordance with an example of the present disclosure.

FIG. 7 illustrates a GUI display for inserting the user portable electronic device (e.g., a telephone) for the example of the apparatus 100, which may be in the form of a vending kiosk as shown in FIG. 4, in accordance with an example of the present disclosure.

Referring to FIG. 7, the GUI display may include instructions to insert the user portable electronic device 106, for example, into the slot 404 to receive the user portable electronic device 106. The instructions may include text, voice, graphical (e.g., animations), and/or other types of instructions for the user 104 to insert the user portable electronic device 106 into the slot 404.

Figure 8:
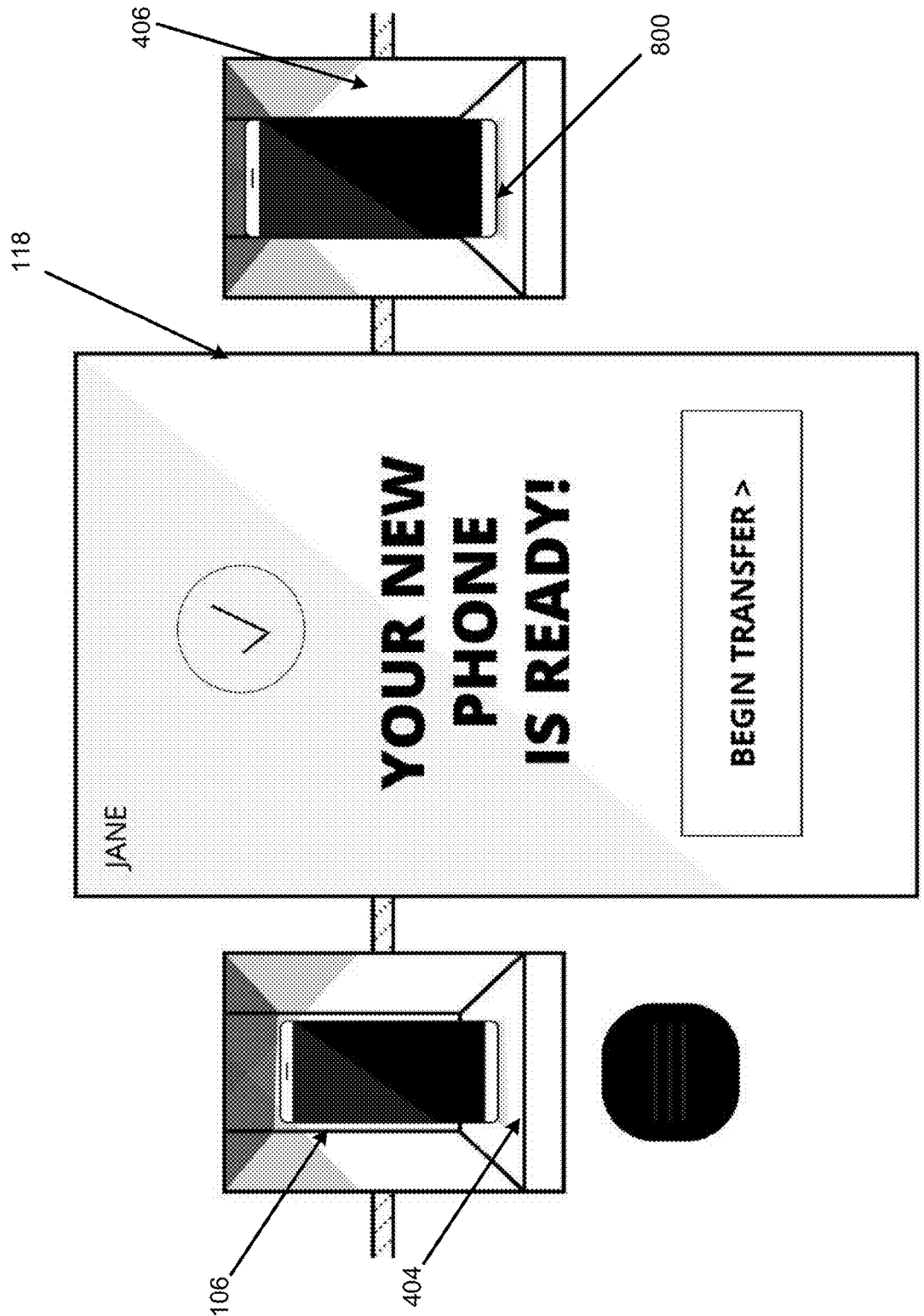
FIG. 8 illustrates a GUI display for initiating data and configuration transfer from the user portable electronic device to a new portable electronic device for the example of the portable electronic device sales, provisioning, and user care apparatus of FIG. 1, which may be in the form of a vending kiosk as shown in FIG. 4, in accordance with an example of the present disclosure.

FIG. 8 illustrates a GUI display for initiating data and configuration transfer from the user portable electronic device (e.g., a telephone) to a new portable electronic device (e.g., a new telephone) for the example of the apparatus 100, which may be in the form of a vending kiosk as shown in FIG. 4, in accordance with an example of the present disclosure.

Referring to FIG. 8, the GUI display may include options for the user 104 to begin transfer of the data 112 and/or the configurations 116 to the selected new portable electronic device. For example, the options may include a "BEGIN TRANSFER" icon that may be selected (e.g., by touching the icon) to begin transfer of the data 112 and/or the configurations 116 to the selected new portable electronic device. The user portable electronic device 106 may be displayed in the slot 404 and the selected new portable electronic device (e.g., at 800) may be displayed in the slot 406.

Figure 9:
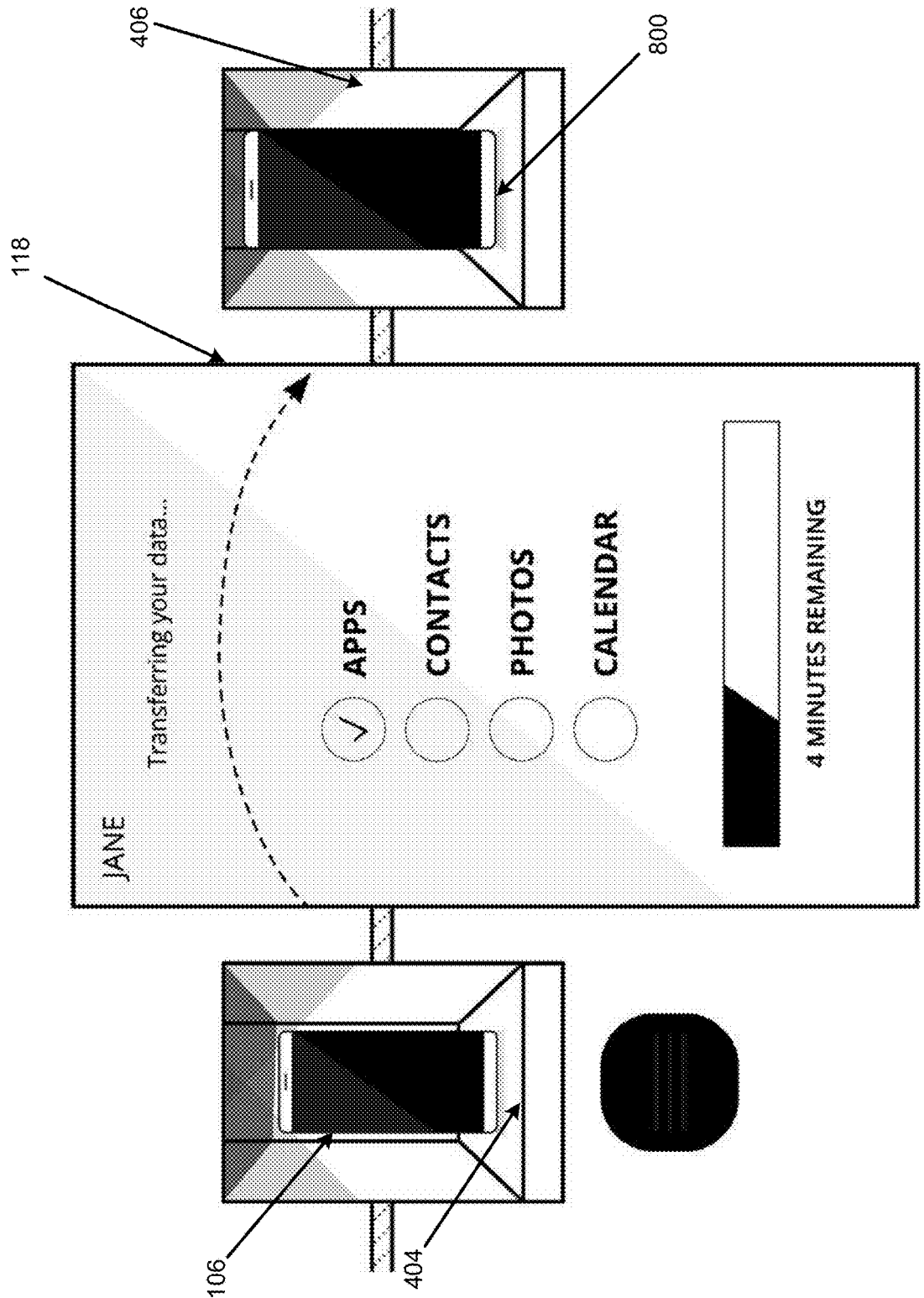
FIG. 9 illustrates a GUI display including a transfer status of data and configuration transfer from the user portable electronic device to the new portable electronic device for the example of the portable electronic device sales, provisioning, and user care apparatus of FIG. 1, which may be in the form of a vending kiosk as shown in FIG. 4, in accordance with an example of the present disclosure.

FIG. 9 illustrates a GUI display including a transfer status of data and configuration transfer from the user portable electronic device (e.g., a telephone) to the new portable electronic device (e.g., a new telephone) for the example of the apparatus 100, which may be in the form of a vending kiosk as shown in FIG. 4, in accordance with an example of the present disclosure.

Referring to FIG. 9, the GUI display may include a transfer status of the data 112 and the configurations 116 from the user portable electronic device 106 to the selected new portable electronic device (e.g., the selected new portable electronic device at 800 of FIG. 8). The transfer status may include a time remaining to complete the transfer, and a transfer status, for example, for the data 112 that includes applications, contacts, photos, calendars, etc.

Figure 10:
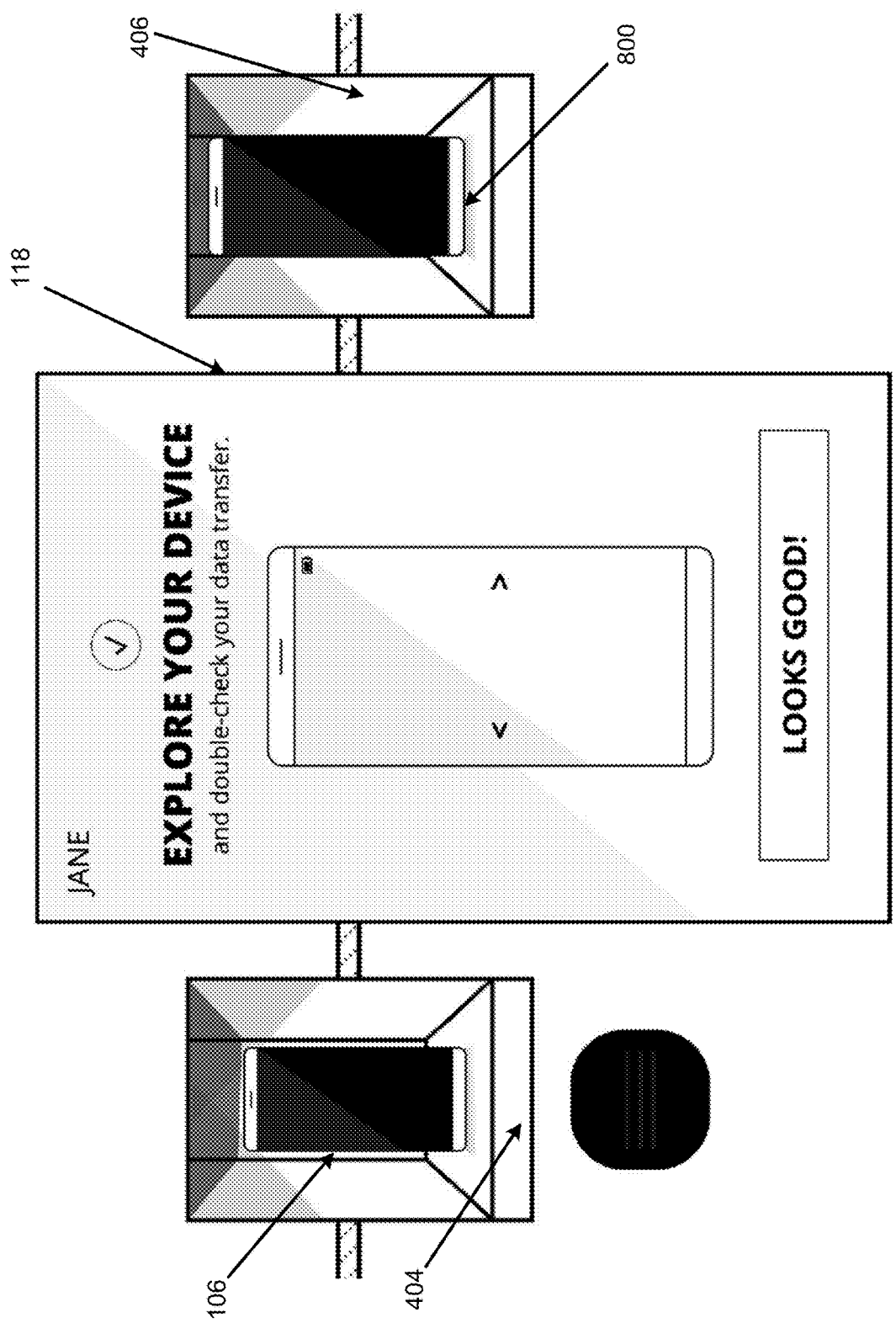
FIG. 10 illustrates a GUI display including a transfer complete status of data and configuration transfer from the user portable electronic device to the new portable electronic device for the example of the portable electronic device sales, provisioning, and user care apparatus of FIG. 1, which may be in the form of a vending kiosk as shown in FIG. 4, in accordance with an example of the present disclosure.

FIG. 10 illustrates a GUI display including a transfer complete status of data and configuration transfer from the user portable electronic device (e.g., a telephone) to the new portable electronic device (e.g., a new telephone) for the example of the apparatus 100, which may be in the form of a vending kiosk as shown in FIG. 4, in accordance with an example of the present disclosure.

Referring to FIG. 10, the GUI display may include a transfer complete status of the data 112 and the configurations 116 from the user portable electronic device 106 to the selected new portable electronic device (e.g., the selected new portable electronic device at 800 of FIG. 8).

Figure 11:
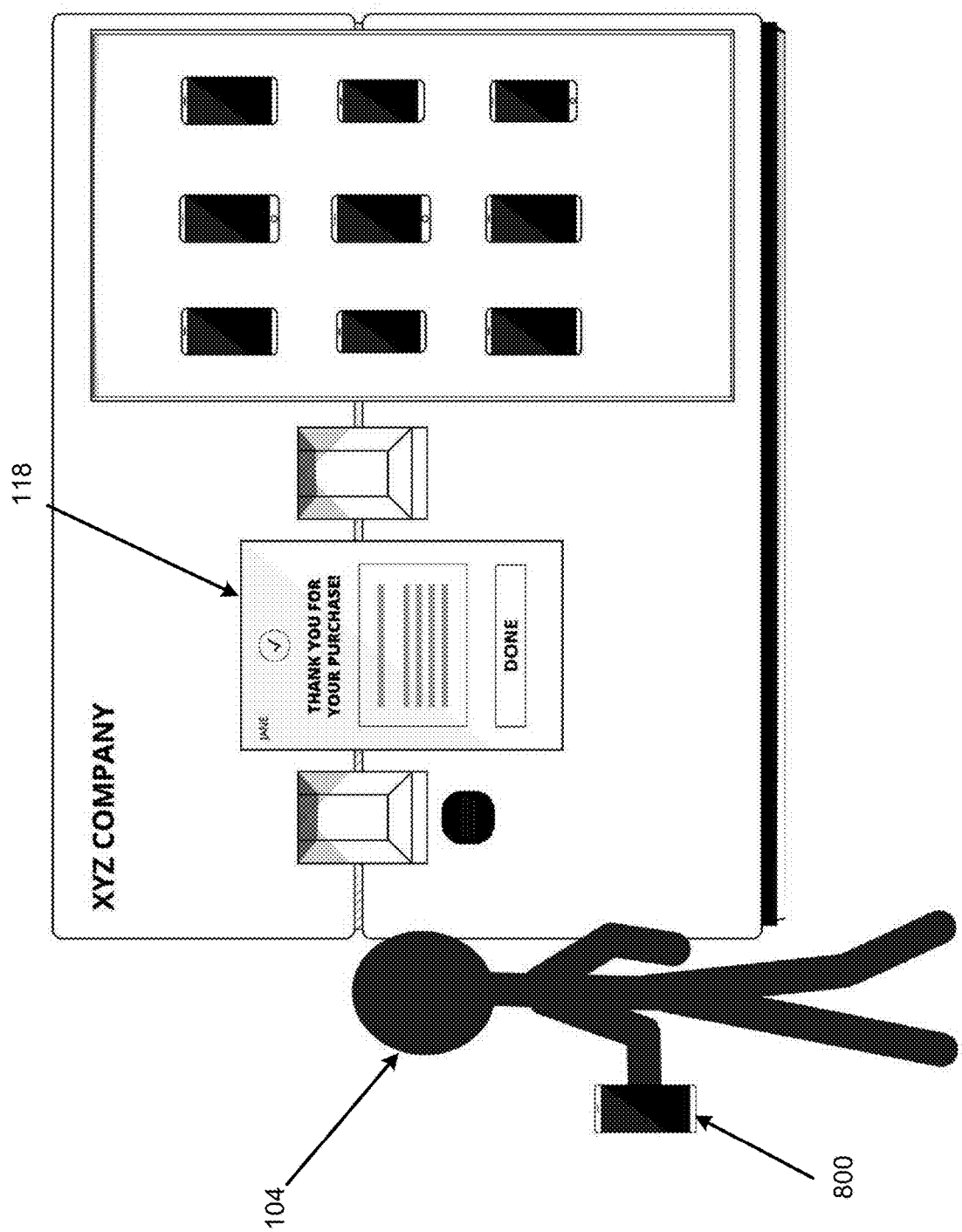
FIG. 11 illustrates a GUI display indicating a completion of a purchase of the new portable electronic device for the example of the portable electronic device sales, provisioning, and user care apparatus of FIG. 1, which may be in the form of a vending kiosk as shown in FIG. 4, in accordance with an example of the present disclosure.

FIG. 11 illustrates a GUI display indicating a completion of a purchase of the new portable electronic device (e.g., a new telephone) for the example of the apparatus 100, which may be in the form of a vending kiosk as shown in FIG. 4, in accordance with an example of the present disclosure.

Referring to FIG. 11, the GUI display may include an indication of a completion of a purchase of the selected new portable electronic device (e.g., the selected new portable electronic device at 800 of FIG. 8).

With respect to FIGS. 12-19 that are described in further detail below, the apparatus 100 may include the functionality to coordinate the pickup of a selected new portable electronic device (e.g., a telephone) at a vending kiosk, where the vending kiosk may include some or all of the functionalities of the apparatus 100 illustrated in FIGS. 1, and 4-11.

Figure 12:
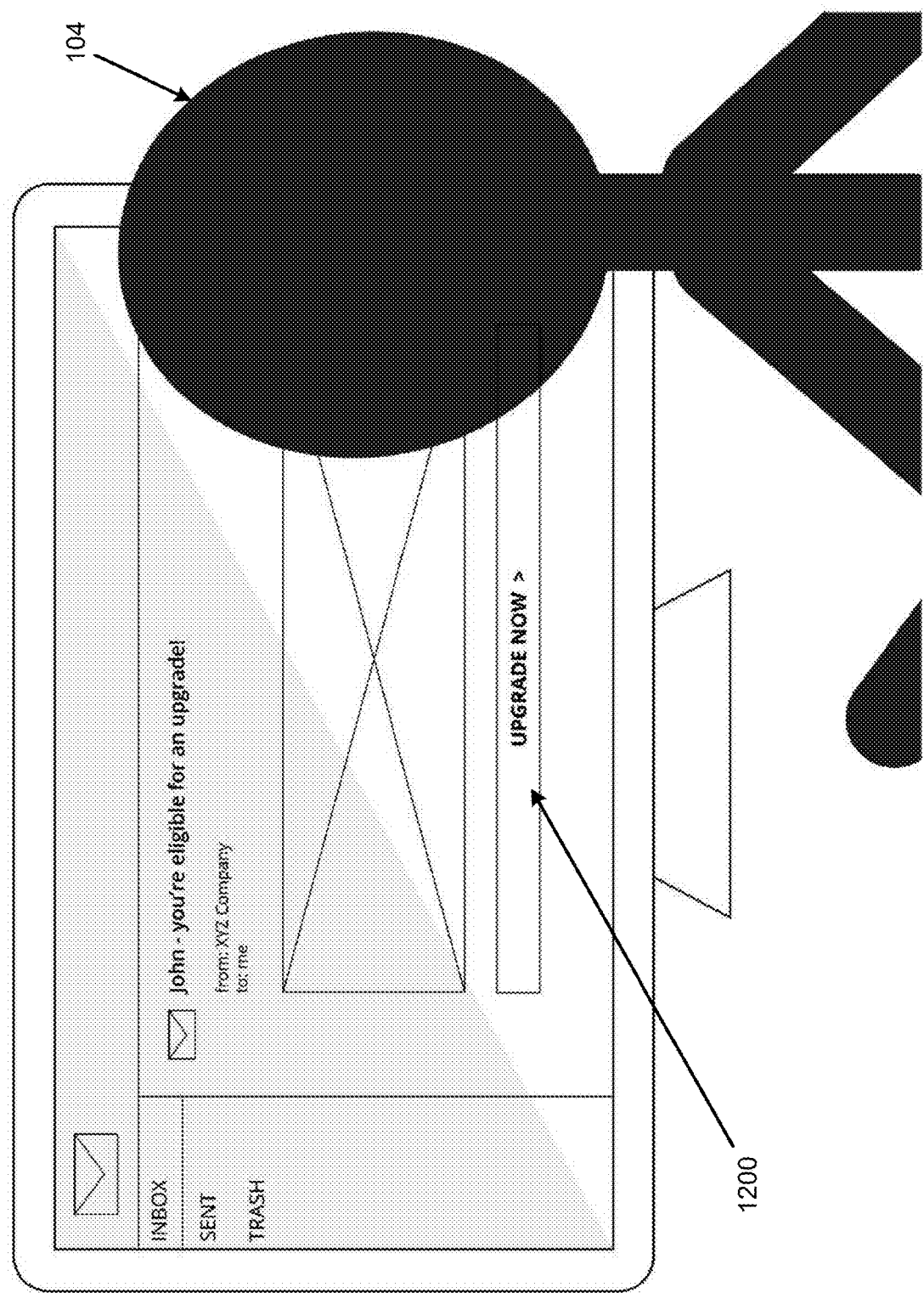
FIG. 12 illustrates a GUI display indicating an online eligibility to upgrade to a new portable electronic device for the example of the portable electronic device sales, provisioning, and user care apparatus of FIG. 1, in accordance with an example of the present disclosure.

FIG. 12 illustrates a GUI display indicating an online eligibility to upgrade to a new portable electronic device for the example of the apparatus 100, in accordance with an example of the present disclosure.

Referring to FIG. 12, as disclosed herein, the online sales and upgrade manager 146 that is executed by at least one hardware processor (e.g., the hardware processor 2002 of FIG. 20 and/or the hardware processor 2204 of FIG. 22) is to manage online sales and upgrade of the user portable electronic device 106 by communicatively coordinating with other components of the apparatus 100 to authenticate the user 104 associated with the user portable electronic device 106, and communicatively connecting to the portable electronic device receptacle 110 of the user portable electronic device 106. The online sales and upgrade manager 146 may communicatively coordinate with other components of the apparatus 100 to transfer, based on the connection and the authentication of the user 104 associated with the user portable electronic device 106, data 112 from the user portable electronic device 106 to the data storage 114, and transfer, based on the connection and the authentication of the user 104 associated with the user portable electronic device 106, configurations 116 associated with the user portable electronic device 106 to the data storage 114. In this regard, as illustrated in FIG. 12, the online sales and upgrade manager 146 may display the upgrade option at 1200 for the user 104 to upgrade the user portable electronic device 106 upon authentication of the user 104.

Figure 13:
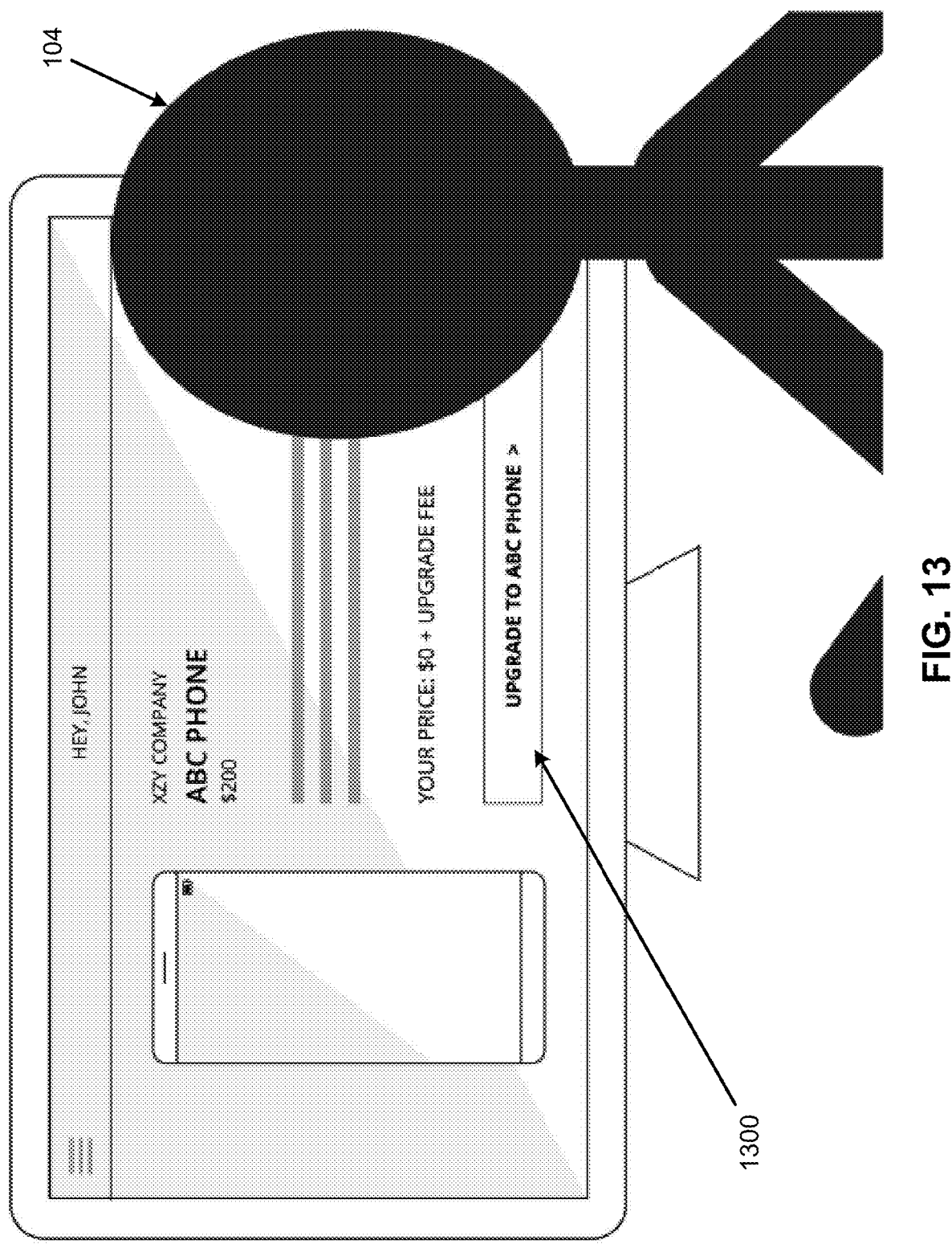
FIG. 13 illustrates a GUI display indicating online upgrade options for the example of the portable electronic device sales, provisioning, and user care apparatus of FIG. 1, in accordance with an example of the present disclosure.

FIG. 13 illustrates a GUI display indicating online upgrade options for the example of the apparatus 100, in accordance with an example of the present disclosure.

Referring to FIG. 13, the online sales and upgrade manager 146 may communicatively coordinate with other components of the apparatus 100 to display options 120 to purchase or upgrade to a new portable electronic device, where the options 120 may include a display of the at least one new portable electronic device 122. The online sales and upgrade manager 146 may communicatively coordinate with other components of the apparatus 100 to receive selection of a new portable electronic device from the display of the at least one new portable electronic device 122, and configure the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device. In this regard, as shown in FIG. 13, transferring of the data 112 and the configurations 116 may commence upon selection of the "UPGRADE TO ABC PHONE" option at 1300 by the user 104.

Figure 14:
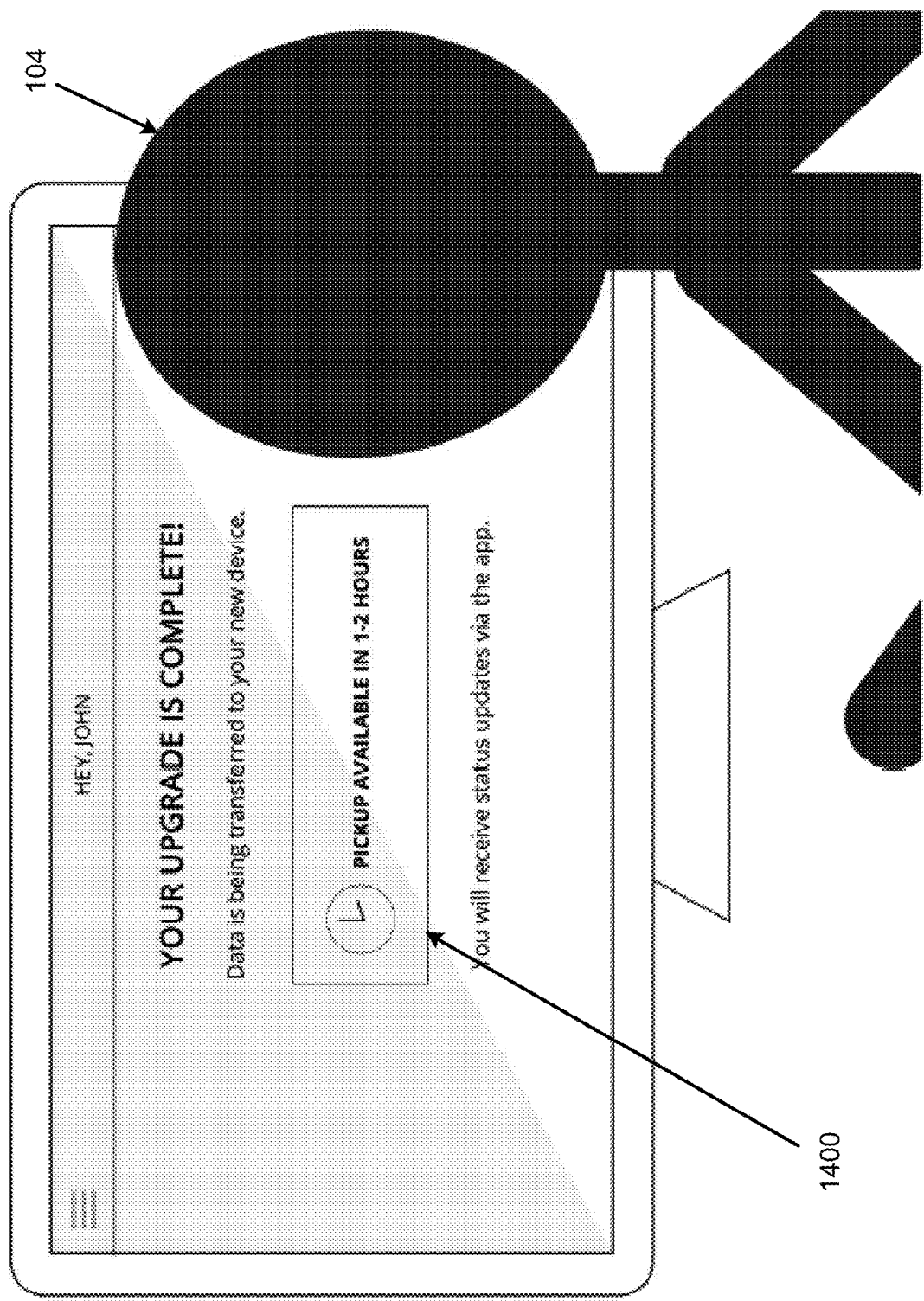
FIG. 14 illustrates a GUI display indicating completion of an online upgrade for the example of the portable electronic device sales, provisioning, and user care apparatus of FIG. 1, in accordance with an example of the present disclosure.

FIG. 14 illustrates a GUI display indicating completion of an online upgrade for the example of the apparatus 100, in accordance with an example of the present disclosure.

Referring to FIG. 14, the online sales and upgrade manager 146 may communicatively coordinate with other components of the apparatus 100 to generate instructions to pick up the selected new portable electronic device at a vending kiosk. For example, as shown in FIG. 14, the online sales and upgrade manager 146 may communicatively coordinate with the GUI 118 to indicate to the user 104 that "Pickup [is] available in 1-2 hours" as shown at 1400.

Figure 15:
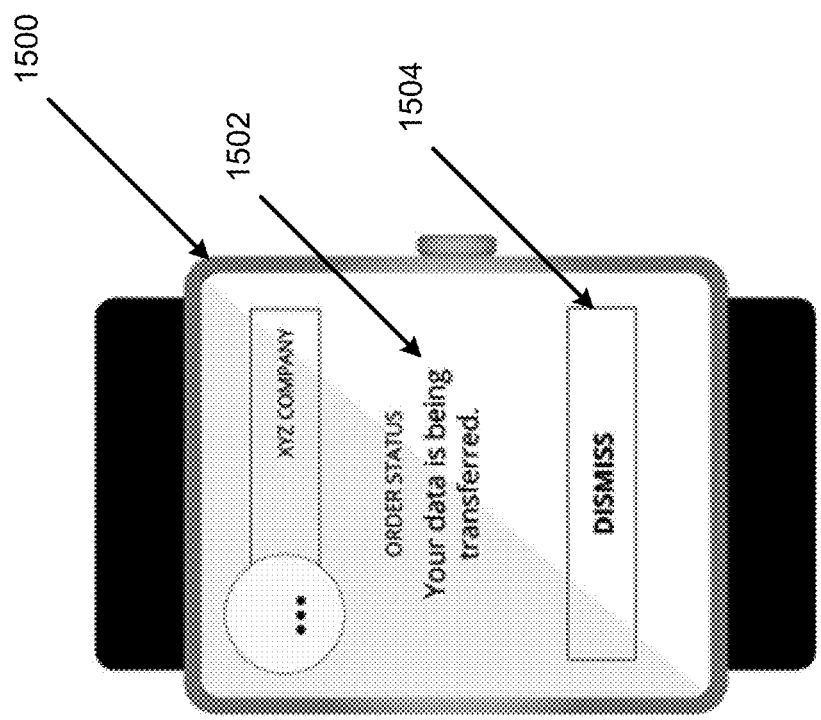
FIG. 15 illustrates a GUI display for a watch indicating an order status for completion of an upgrade for the example of the portable electronic device sales, provisioning, and user care apparatus of FIG. 1, in accordance with an example of the present disclosure.

FIG. 15 illustrates a GUI display for a watch (e.g., a smart watch) indicating an order status for completion of an upgrade for the example of the apparatus 100, in accordance with an example of the present disclosure.

Referring to FIG. 15, the various options 120 and instructions that are displayed to the user 104 may be displayed on a watch 1500 (or another such portable electronic device). For example, as shown in FIG. 15, the watch 1500 may include the display of an order status at 1502 (e.g., "Your data is being processed"), an option to dismiss at 1504, etc., where selection of the option to dismiss may result in the display of a previous or another set of options or instructions.

Figure 16:
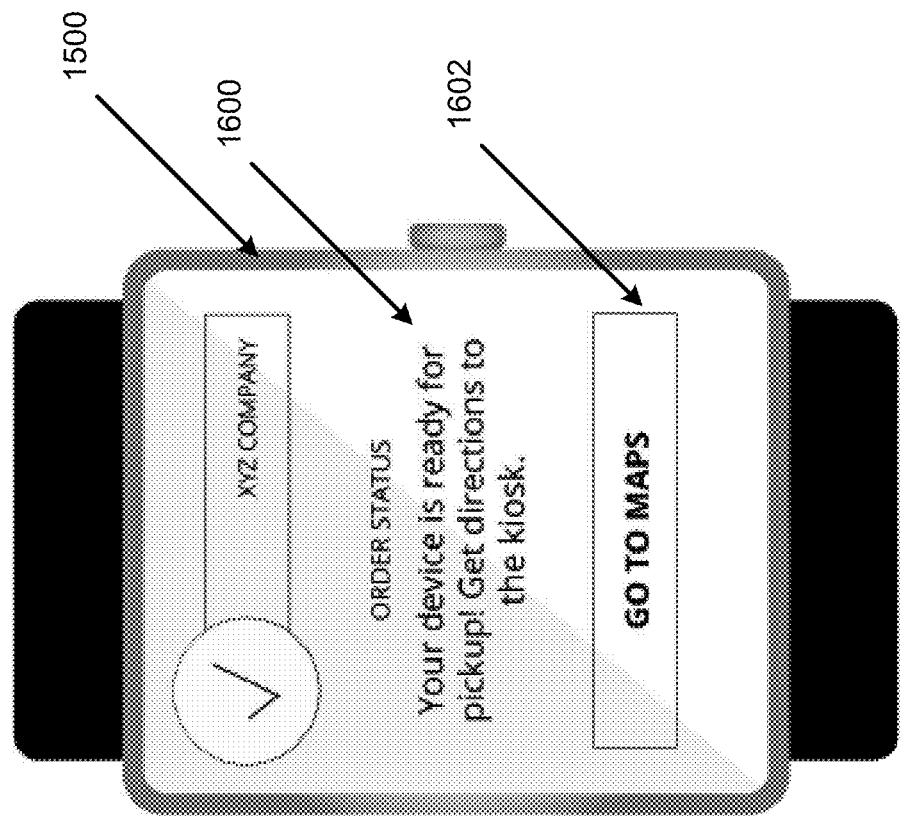
FIG. 16 illustrates a GUI display for the watch of FIG. 15 indicating an order status indication completion of an upgrade for the example of the portable electronic device sales, provisioning, and user care apparatus of FIG. 1, in accordance with an example of the present disclosure.

FIG. 16 illustrates a GUI display for the watch of FIG. 15 indicating an order status indication completion of an upgrade for the example of the apparatus 100, in accordance with an example of the present disclosure.

Referring to FIG. 16, the watch 1500 may include the display of an order status at 1600 (e.g., "Your device is ready for pickup! Get directions to the kiosk"), an option 1602 to go to maps to determine the nearest vending kiosk to retrieve the selected new watch, etc.

Figure 17:
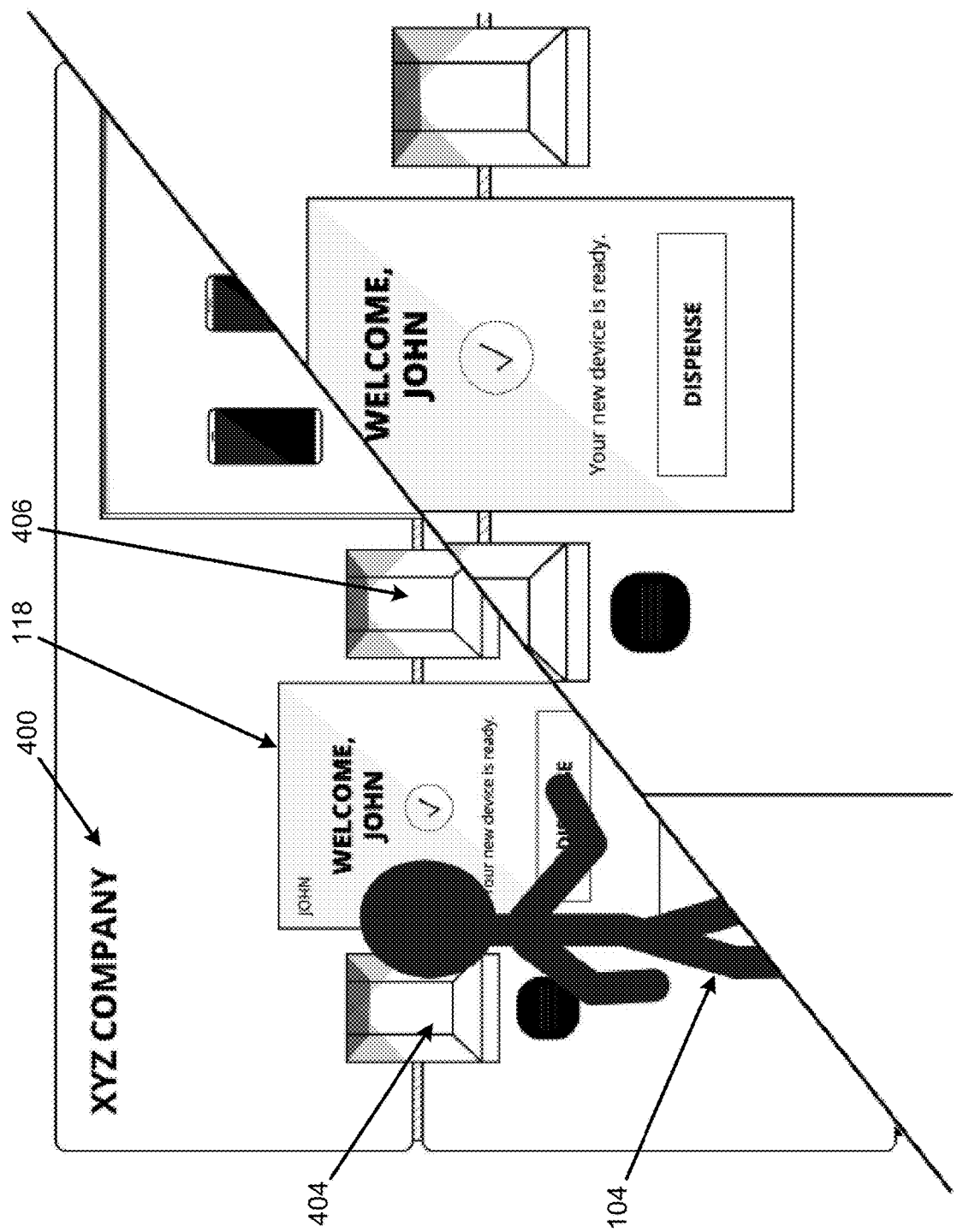
FIG. 17 illustrates a GUI display indicating user authentication for completion of a purchase of the new portable electronic device for the example of the portable electronic device sales, provisioning, and user care apparatus of FIG. 1, which may be in the form of a vending kiosk, in accordance with an example of the present disclosure.

FIG. 17 illustrates a GUI display indicating user authentication for completion of a purchase of the new portable electronic device for the example of the apparatus 100, which may be in the form of a vending kiosk, in accordance with an example of the present disclosure.

Referring to FIG. 17, the transaction manager 102 is executed by at least one hardware processor (e.g., the hardware processor 2002 of FIG. 20 and/or the hardware processor 2204 of FIG. 22) to authenticate the user 104 associated with the portable electronic device 106, such as the user telephone.

Figure 18:
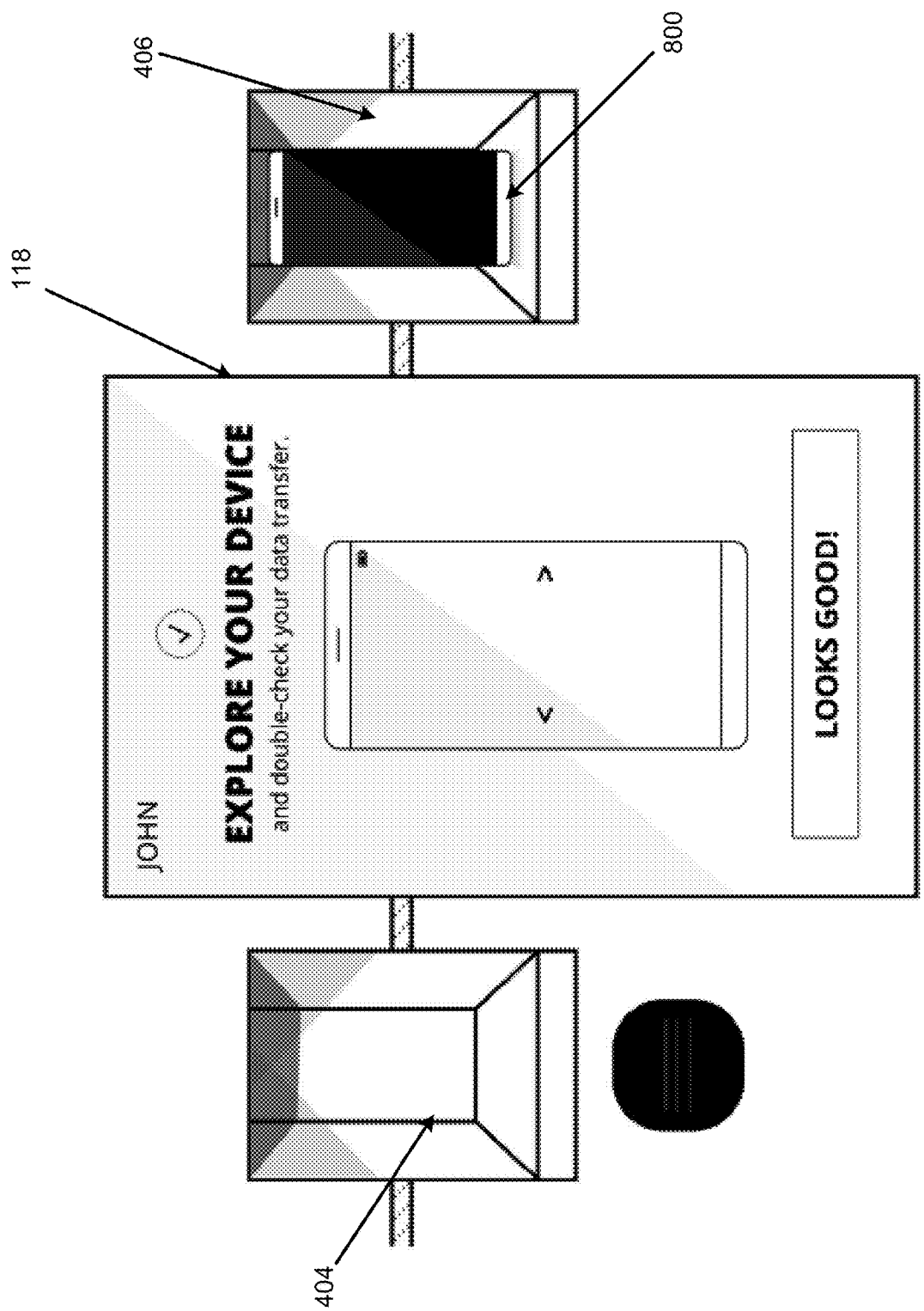
FIG. 18 illustrates a GUI display including completion of a purchase of the new portable electronic device for the example of the portable electronic device sales, provisioning, and user care apparatus of FIG. 1, which may be in the form of a vending kiosk, in accordance with an example of the present disclosure.

FIG. 18 illustrates a GUI display including completion of a purchase of the new portable electronic device for the example of the apparatus 100, which may be in the form of a vending kiosk, in accordance with an example of the present disclosure.

Referring to FIG. 18, the user 104 may deposit the user portable electronic device 106 in the slot 404. Alternatively, assuming that the user 104 has mailed the user portable electronic device 106 to the portable electronic device service provider 140 (or another company), is receiving the selected new portable electronic device at 800 without returning the user portable electronic device 106, or is otherwise picking up the selected new portable electronic device at 800, upon being authenticated, the user 104 may retrieve the selected new portable electronic device at 800.

Figure 19:
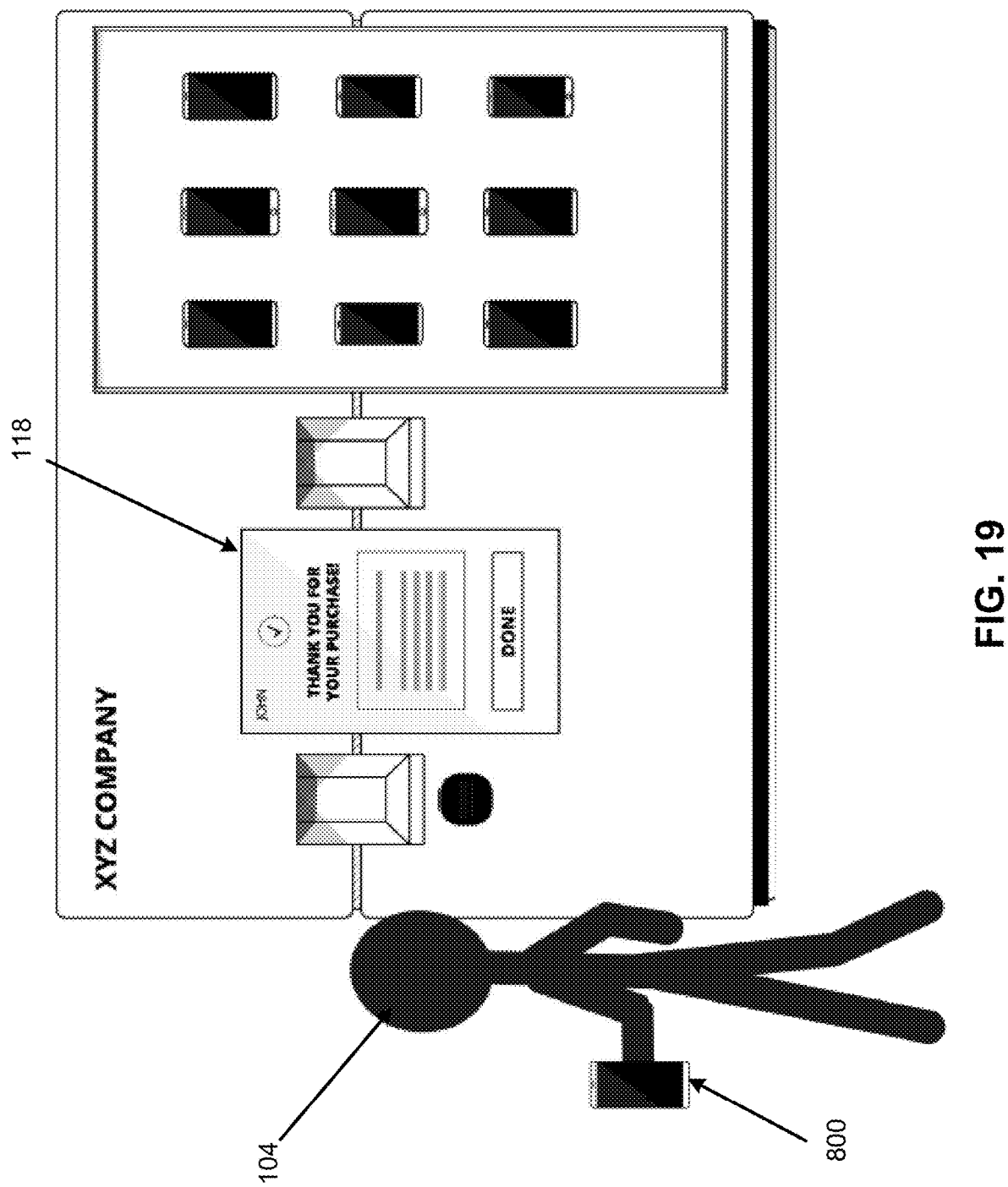
FIG. 19 illustrates completion of a purchase of the new portable electronic device for the example of the portable electronic device sales, provisioning, and user care apparatus of FIG. 1, which may be in the form of a vending kiosk, in accordance with an example of the present disclosure.

FIG. 19 illustrates completion of a purchase of the new portable electronic device for the example of the apparatus 100, which may be in the form of a vending kiosk, in accordance with an example of the present disclosure.

Referring to FIG. 19, the GUI display may include an indication of a completion of a purchase of the selected new portable electronic device (e.g., the selected new portable electronic device at 800).

Figure 20:
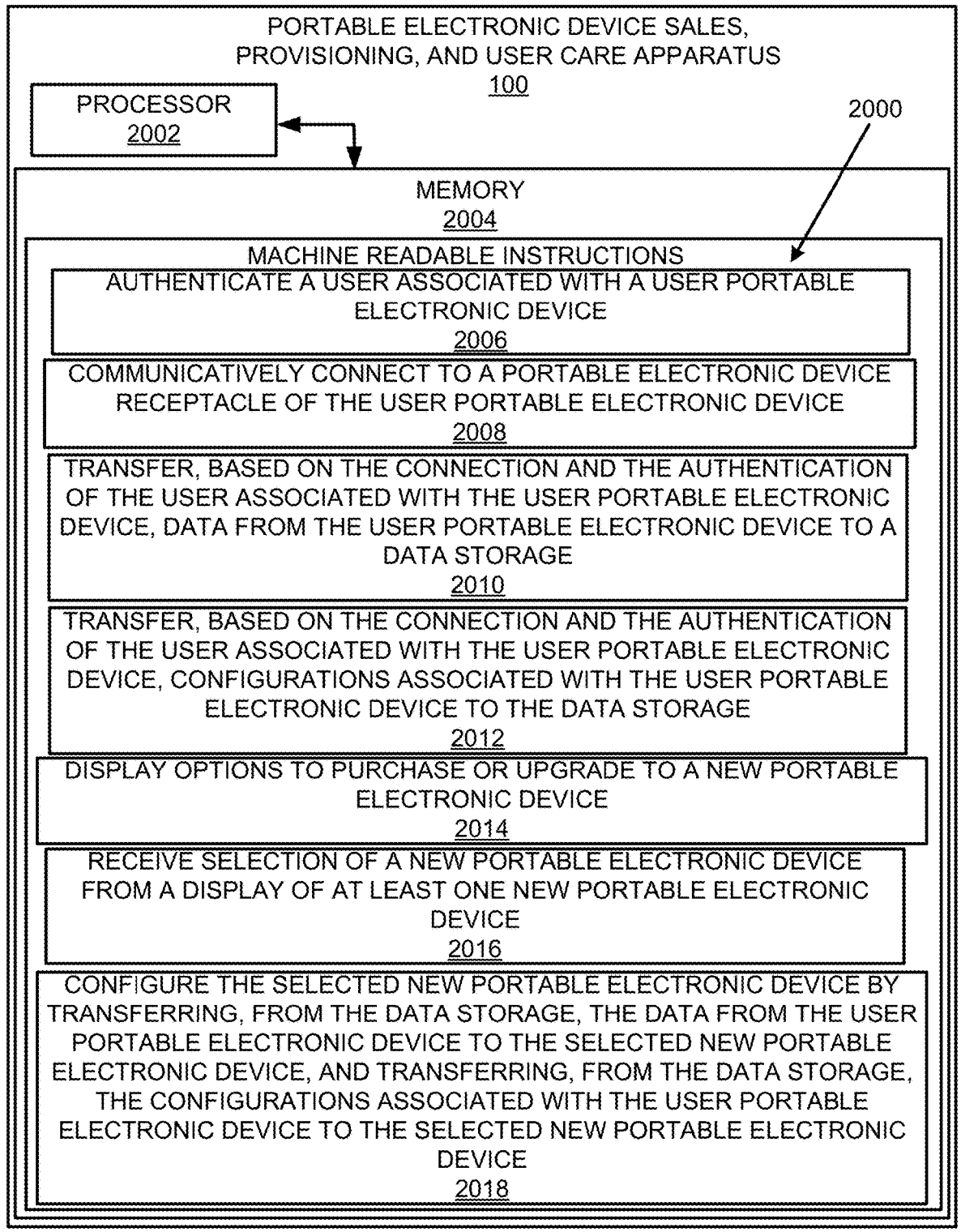
FIG. 20 illustrates an example block diagram for portable electronic device sales, provisioning, and user care in accordance with an example of the present disclosure.
Figure 21:
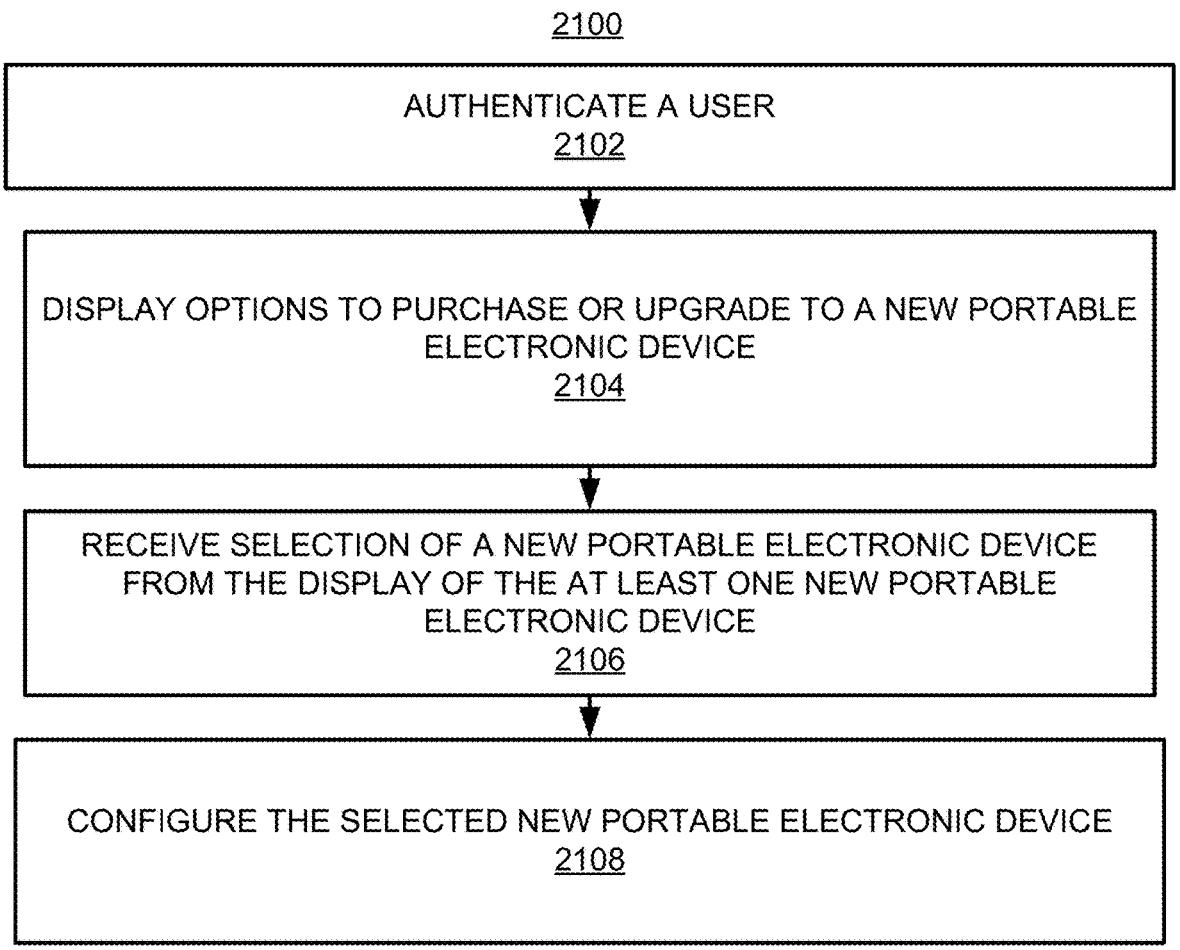
FIG. 21 illustrates a flowchart of an example method for portable electronic device sales, provisioning, and user care in accordance with an example of the present disclosure.
Figure 22:
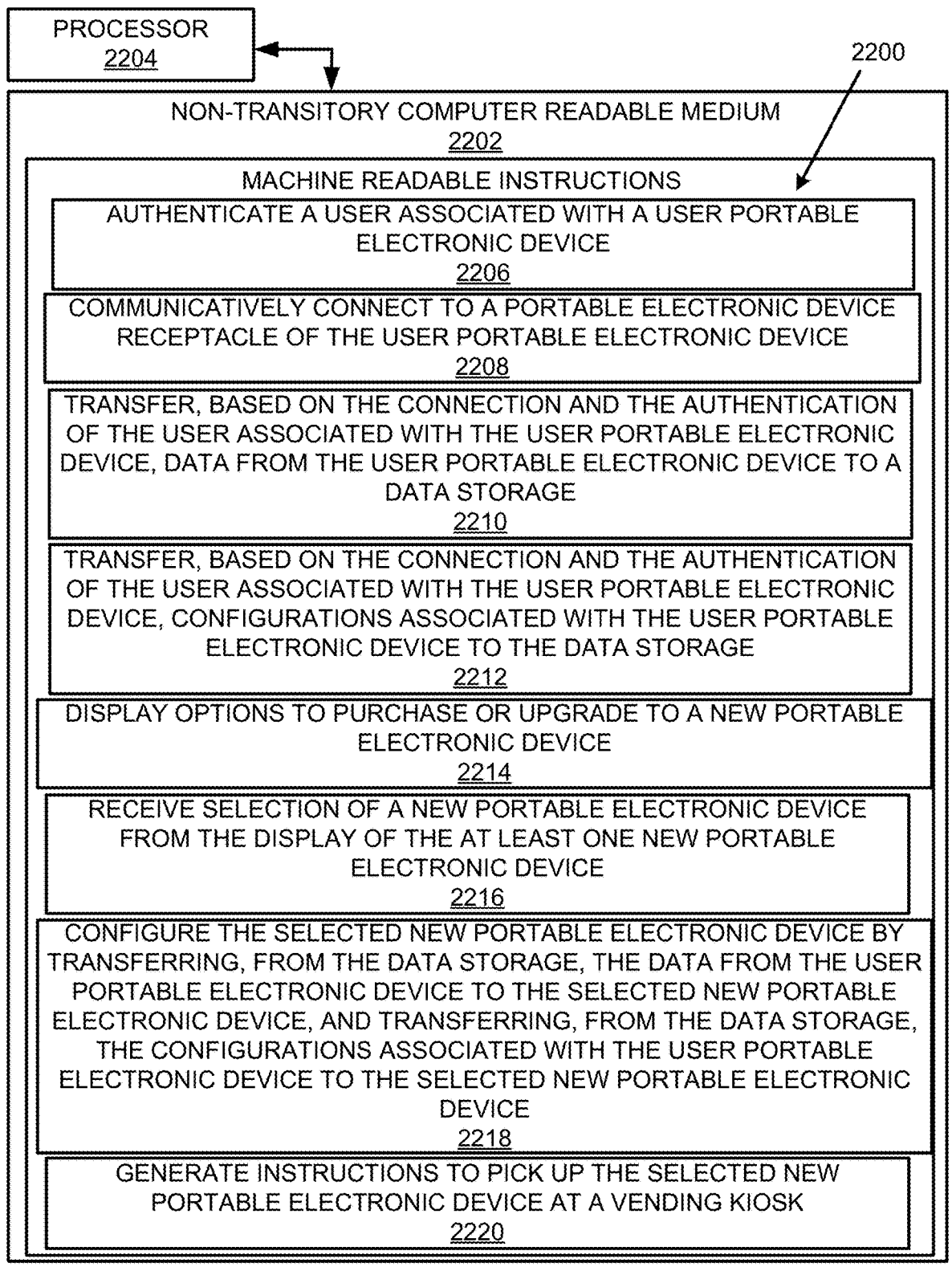
FIG. 22 illustrates a further example block diagram for portable electronic device sales, provisioning, and user care in accordance with another example of the present disclosure.

FIGS. 20-22 respectively illustrate an example block diagram 2000, a flowchart of an example method 2100, and a further example block diagram 2200 for portable electronic device sales, provisioning, and user care, according to examples. The block diagram 2000, the method 2100, and the block diagram 2200 may be implemented on the apparatus 100 described above with reference to FIG. 1 by way of example and not of limitation. The block diagram 2000, the method 2100, and the block diagram 2200 may be practiced in other apparatus. In addition to showing the block diagram 2000, FIG. 20 shows hardware of the apparatus 100 that may execute the instructions of the block diagram 2000. The hardware may include a processor 2002, and a memory 2004 storing machine readable instructions that when executed by the processor cause the processor to perform the instructions of the block diagram 2000. The memory 2004 may represent a non-transitory computer readable medium. FIG. 21 may represent an example method for portable electronic device sales, provisioning, and user care, and the steps of the method. FIG. 22 may represent a non-transitory computer readable medium 2202 having stored thereon machine readable instructions to provide portable electronic device sales, provisioning, and user care according to an example. The machine readable instructions, when executed, cause a processor 2204 to perform the instructions of the block diagram 2200 also shown in FIG. 22.

The processor 2002 of FIG. 20 and/or the processor 2204 of FIG. 22 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2202 of FIG. 22), such as hardware storage devices (e.g., RAM (random access memory), ROM (read only memory), EPROM (erasable, programmable ROM), EEPROM (electrically erasable, programmable ROM), hard drives, and flash memory). The memory 2004 may include a RAM, where the machine readable instructions and data for a processor may reside during runtime.

Referring to FIGS. 1-20, and particularly to the block diagram 2000 shown in FIG. 20, the memory 2004 may include instructions 2006 to authenticate (e.g., by the transaction manager 102 that is executed by at least one hardware processor) the user 104 associated with the user portable electronic device 106.

The processor 2002 may fetch, decode, and execute the instructions 2008 to communicatively connect (e.g., by the user portable electronic device connector 108 that is executed by the at least one hardware processor) to the portable electronic device receptacle 110 of the user portable electronic device 106. In this regard, the user portable electronic device connector 108 may include hardware and machine readable instructions features. The hardware features may provide for physical interconnection of the user portable electronic device connector 108 to the portable electronic device receptacle 110, and the machine readable instructions features may provide for the communicative coupling of the user portable electronic device connector 108 and the portable electronic device receptacle 110 for the exchange of the data 112, the configurations 116, and other information.

The processor 2002 may fetch, decode, and execute the instructions 2010 to transfer (e.g., by the user portable electronic device connector 108 that is executed by the at least one hardware processor), based on the connection and the authentication of the user 104 associated with the user portable electronic device 106, data 112 from the user portable electronic device 106 to the data storage 114.

The processor 2002 may fetch, decode, and execute the instructions 2012 to transfer (e.g., by the user portable electronic device connector 108 that is executed by the at least one hardware processor), based on the connection and the authentication of the user 104 associated with the user portable electronic device 106, configurations 116 associated with the user portable electronic device 106 to the data storage 114.

The processor 2002 may fetch, decode, and execute the instructions 2014 to display (e.g., by the GUI 118 that is executed by the at least one hardware processor) options 120 to purchase a new portable electronic device. The options 120 may include a display of at least one new portable electronic device 122, and/or an option to view a virtual reality display of the at least one new portable electronic device 122.

The processor 2002 may fetch, decode, and execute the instructions 2016 to receive (e.g., by the new portable electronic device configuration manager 124 that is executed by the at least one hardware processor) selection of a new portable electronic device from the display of the at least one new portable electronic device 122.

The processor 2002 may fetch, decode, and execute the instructions 2018 to configure (e.g., by the new portable electronic device configuration manager 124 that is executed by the at least one hardware processor) the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device.

Referring to FIGS. 1-19 and 21, and particularly FIG. 21, for the method 2100, at block 2102, the method may include authenticating (e.g., by the transaction manager 102 that is executed by at least one hardware processor) the user 104.

At block 2104, the method may include displaying (e.g., by the GUI 118 that is executed by the at least one hardware processor) options 120 to purchase a new portable electronic device. According to an example, the options 120 may include a display of at least one new portable electronic device 122, and/or an option to view a virtual reality display of the at least one new portable electronic device 122.

At block 2106, the method may include receiving (e.g., by the new portable electronic device configuration manager 124 that is executed by the at least one hardware processor) selection of a new portable electronic device from the display of the at least one new portable electronic device 122.

At block 2108, the method may include configuring (e.g., by the new portable electronic device configuration manager 124 that is executed by the at least one hardware processor) the selected new portable electronic device.

According to an example, the method 2100 may include communicatively connecting (e.g., by the user portable electronic device connector 108 that is executed by the at least one hardware processor), to the portable electronic device receptacle 110 of the user portable electronic device 106 of the user. Further, the method 2100 may include transferring (e.g., by the user portable electronic device connector 108 that is executed by the at least one hardware processor), and based on the connection and the authentication of the user 104 associated with the user portable electronic device 106, data 112 from the user portable electronic device 106 to the data storage 114. Further, the method 2100 may include transferring (e.g., by the user portable electronic device connector 108 that is executed by the at least one hardware processor), and based on the connection and the authentication of the user 104 associated with the user portable electronic device 106, configurations 116 associated with the user portable electronic device 106 to the data storage 114. Further, the method 2100 may include configuring (e.g., by the new portable electronic device configuration manager 124 that is executed by the at least one hardware processor), the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device.

According to an example, the method 2100 may include securely locking the user portable electronic device 106 to prevent release of the user portable electronic device 106 to the user during configuring (e.g., by the new portable electronic device configuration manager 124 that is executed by the at least one hardware processor) of the selected new portable electronic device. For example, referring to FIG. 4, when the user portable electronic device 106 is inserted into the slot 404, a sliding glass door may be used to prevent removal of the user portable electronic device 106 until release thereof.

According to an example, the method 2100 may include displaying (e.g., by the GUI 118 that is executed by the at least one hardware processor), a plurality of customer review-based attributes associated with the at least one new portable electronic device 122. For example, the customer review-based attributes may include customer reviews, a star rating (e.g., a 1 to 5 star rating), etc., with respect to the at least one new portable electronic device 122.

Referring to FIGS. 1-19 and 22, and particularly FIG. 22, for the block diagram 2200, the non-transitory computer readable medium 2202 may include instructions 2206 to authenticate the user 104 associated with the user portable electronic device 106.

The processor 2204 may fetch, decode, and execute the instructions 2208 to communicatively connect to the portable electronic device receptacle 110 of the user portable electronic device 106.

The processor 2204 may fetch, decode, and execute the instructions 2210 to transfer, based on the connection and the authentication of the user 104 associated with the user portable electronic device 106, data 112 from the user portable electronic device 106 to the data storage 114.

The processor 2204 may fetch, decode, and execute the instructions 2212 to transfer, based on the connection and the authentication of the user 104 associated with the user portable electronic device 106, configurations 116 associated with the user portable electronic device 106 to the data storage 114.

The processor 2204 may fetch, decode, and execute the instructions 2214 to display options 120 to purchase or upgrade to a new portable electronic device, where the options 120 include a display of at least one new portable electronic device 122.

The processor 2204 may fetch, decode, and execute the instructions 2216 to receive selection of a new portable electronic device from the display of the at least one new portable electronic device 122.

The processor 2204 may fetch, decode, and execute the instructions 2218 to configure the selected new portable electronic device by transferring, from the data storage 114, the data 112 from the user portable electronic device 106 to the selected new portable electronic device, and transferring, from the data storage 114, the configurations 116 associated with the user portable electronic device 106 to the selected new portable electronic device.

The processor 2204 may fetch, decode, and execute the instructions 2220 to generate instructions to pick up the selected new portable electronic device at a vending kiosk.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a transaction manager, executed by at least one hardware processor, to authenticate a user associated with a user portable electronic device;
a user portable electronic device connector, executed by the at least one hardware processor, to
implement communication with the user portable electronic device upon connection of the user portable electronic device connector to a portable electronic device receptacle of the user portable electronic device,
transfer, based on the connection and the authentication of the user associated with the user portable electronic device, data from the user portable electronic device to a data storage, and
transfer, based on the connection and the authentication of the user associated with the user portable electronic device, configurations associated with the user portable electronic device to the data storage;
a graphical user interface, executed by the at least one hardware processor, to
display options to purchase or upgrade to a new portable electronic device;
a new portable electronic device configuration manager, executed by the at least one hardware processor, to
receive selection of a new portable electronic device from a display of at least one new portable electronic device, and
configure the selected new portable electronic device by transferring, from the data storage, the data from the user portable electronic device to the selected new portable electronic device; and
at least one aperture to permit insertion of a hand of the user into the at least one aperture to physically analyze the selected new portable electronic device prior to dispensing of the selected new portable electronic device to the user.

2. The apparatus according to claim 1, wherein the new portable electronic device configuration manager is executed by the at least one hardware processor to:
configure the selected new portable electronic device by transferring, from the data storage, the configurations associated with the user portable electronic device to the selected new portable electronic device.

3. The apparatus according to claim 1, further comprising:
at least one sample portable electronic device associated with a corresponding one of the at least one new portable electronic device; and
a connector to securely retain the at least one sample portable electronic device.

4. The apparatus according to claim 1, further comprising:
at least one inoperable model portable electronic device associated with a corresponding one of the at least one new portable electronic device; and
a connector to securely retain the at least one inoperable model portable electronic device.

5. The apparatus according to claim 1, further comprising:
a virtual reality headset to generate a virtual reality display of the at least one new portable electronic device.

6. The apparatus according to claim 1, wherein the new portable electronic device configuration manager is executed by the at least one hardware processor to
receive authorization from a portable electronic device service provider to activate the selected new portable electronic device, and
activate, based on the received authorization, the selected new portable electronic device.

7. The apparatus according to claim 1, wherein
the graphical user interface is executed by the at least one hardware processor to
display plan change options for the selected new portable electronic device, and
receive selection of a plan change from the displayed plan change options.

8. The apparatus according to claim 7, wherein
the new portable electronic device configuration manager is executed by the at least one hardware processor to
receive authorization from a portable electronic device service provider to activate the selected new portable electronic device, and
activate, based on the received authorization and the received selection of the plan change, the selected new portable electronic device.

9. The apparatus according to claim 1, wherein
the graphical user interface is executed by the at least one hardware processor to
display payment options for the selected new portable electronic device, and
receive selection of a payment from the displayed payment options.

10. The apparatus according to claim 9, wherein
the new portable electronic device configuration manager is executed by the at least one hardware processor to
activate, based on completion of the received selection of the payment, the selected new portable electronic device.

11. The apparatus according to claim 1, wherein the portable electronic device includes a telephone.

12. A computer implemented method comprising:
authenticating, by at least one hardware processor, a user;
generating, by the at least one hardware processor, a display of options to purchase or upgrade to a new portable electronic device, wherein the options include at least one of
a display of at least one new portable electronic device, or
an option to view a virtual reality display of the at least one new portable electronic device; and
receiving, by the at least one hardware processor, selection of a new portable electronic device from the display of the at least one new portable electronic device;
configuring, by the at least one hardware processor, the selected new portable electronic device; and
permitting insertion of a hand of the user into at least one aperture to physically analyze the selected new portable electronic device prior to dispensing of the selected new portable electronic device to the user.

13. The method according to claim 12, further comprising:
communicatively connecting, by the at least one hardware processor, to a portable electronic device receptacle of a user portable electronic device of the user;

transferring, by the at least one hardware processor, and based on the connection and the authentication of the user associated with the user portable electronic device, data from the user portable electronic device to a data storage; and configuring, by the at least one hardware processor, the selected new portable electronic device by transferring, from the data storage, the data from the user portable electronic device to the selected new portable electronic device.

14. The method according to claim 12, further comprising:

communicatively connecting, by the at least one hardware processor, to a portable electronic device receptacle of a user portable electronic device of the user;

transferring, by the at least one hardware processor, and based on the connection and the authentication of the user associated with the user portable electronic device, configurations associated with the user portable electronic device to the data storage; and configuring, by the at least one hardware processor, the selected new portable electronic device by transferring, from the data storage, the configurations associated with the user portable electronic device to the selected new portable electronic device.

15. The method according to claim 14, further comprising:

securely locking the user portable electronic device to prevent release of the user portable electronic device to the user during configuring, by the at least one hardware processor, of the selected new portable electronic device.

16. The method according to claim 12, further comprising:

generating, by the at least one hardware processor, a display of a plurality of customer review-based attributes associated with the at least one new portable electronic device.

17. The apparatus according to claim 1, wherein the at least one aperture includes a glove connected thereto to permit the insertion of the hand of the user into the glove and the aperture to physically analyze the selected new portable electronic device.

* * * * *